(12) United States Patent
Holz

(10) Patent No.: US 11,720,180 B2
(45) Date of Patent: *Aug. 8, 2023

(54) SYSTEMS AND METHODS FOR MACHINE CONTROL

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,212

(22) Filed: Jul. 11, 2022

(65) Prior Publication Data

US 2022/0350417 A1 Nov. 3, 2022

Related U.S. Application Data

(63) Continuation of application No. 16/908,643, filed on Jun. 22, 2020, now Pat. No. 11,493,998, which is a continuation of application No. 15/696,086, filed on Sep. 5, 2017, now Pat. No. 10,691,219, which is a continuation of application No. 15/392,920, filed on Dec. 28, 2016, now Pat. No. 9,778,752, which is a
(Continued)

(51) Int. Cl.
| | |
|---|---|
| *G06F 3/01* | (2006.01) |
| *G06F 3/03* | (2006.01) |
| *G06V 10/145* | (2022.01) |
| *G06V 40/10* | (2022.01) |

(52) U.S. Cl.
CPC ............ *G06F 3/017* (2013.01); *G06F 3/0304* (2013.01); *G06V 10/145* (2022.01); *G06V 40/113* (2022.01); *G06F 2218/08* (2023.01)

(58) Field of Classification Search
CPC ... G06F 3/017; G06F 3/0304; G06K 9/00523; G06V 10/145; G06V 40/113
See application file for complete search history.

(56) References Cited

U.S. PATENT DOCUMENTS

| | | |
|---|---|---|
| 2,665,041 A | 1/1954 | Maffucci |
| 4,175,862 A | 11/1979 | DiMatteo et al. |
(Continued)

FOREIGN PATENT DOCUMENTS

| | | |
|---|---|---|
| CN | 1984236 A | 6/2007 |
| CN | 201332447 Y | 10/2009 |
(Continued)

OTHER PUBLICATIONS

Barat et al., "Feature Correspondences From Multiple Views of Coplanar Ellipses", 2nd International Symposium on Visual Computing, Author Manuscript, 2006, 10 pages.
(Continued)

*Primary Examiner* — Ibrahim A Khan
(74) *Attorney, Agent, or Firm* — Haynes Beffel & Wolfeld LLP; Andrew L. Dunlap

(57) ABSTRACT

A region of space may be monitored for the presence or absence of one or more control objects, and object attributes and changes thereto may be interpreted as control information provided as input to a machine or application. In some embodiments, the region is monitored using a combination of scanning and image-based sensing.

20 Claims, 15 Drawing Sheets

Related U.S. Application Data continuation of application No. 14/280,018, filed on May 16, 2014, now Pat. No. 9,679,215, which is a continuation-in-part of application No. 14/106,140, filed on Dec. 13, 2013, now Pat. No. 9,153,028, which is a continuation of application No. 13/742,953, filed on Jan. 16, 2013, now Pat. No. 8,638,989, which is a continuation-in-part of application No. 13/414,485, filed on Mar. 7, 2012, now abandoned, and a continuation-in-part of application No. 13/724,357, filed on Dec. 21, 2012, now Pat. No. 9,070,019, said application No. 14/280,018 is a continuation-in-part of application No. 14/212,485, filed on Mar. 14, 2014, now abandoned, said application No. 14/280,018 is a continuation-in-part of application No. 14/154,730, filed on Jan. 14, 2014, now Pat. No. 9,501,152, said application No. 14/280,018 is a continuation-in-part of application No. 14/250,758, filed on Apr. 11, 2014, now abandoned, said application No. 13/724,357 is a continuation-in-part of application No. 13/414,485, filed on Mar. 7, 2012, now abandoned.

(60) Provisional application No. 61/724,091, filed on Nov. 8, 2012, provisional application No. 61/587,554, filed on Jan. 17, 2012, provisional application No. 61/792,025, filed on Mar. 15, 2013, provisional application No. 61/800,327, filed on Mar. 15, 2013, provisional application No. 61/801,479, filed on Mar. 15, 2013, provisional application No. 61/825,515, filed on May 20, 2013, provisional application No. 61/825,480, filed on May 20, 2013, provisional application No. 61/877,641, filed on Sep. 13, 2013, provisional application No. 61/816,487, filed on Apr. 26, 2013, provisional application No. 61/824,691, filed on May 17, 2013, provisional application No. 61/752,725, filed on Jan. 15, 2013, provisional application No. 61/752,731, filed on Jan. 15, 2013, provisional application No. 61/752,733, filed on Jan. 15, 2013, provisional application No. 61/791,204, filed on Mar. 15, 2013, provisional application No. 61/808,959, filed on Apr. 5, 2013, provisional application No. 61/808,984, filed on Apr. 5, 2013, provisional application No. 61/872,538, filed on Aug. 30, 2013, provisional application No. 61/871,790, filed on Aug. 29, 2013, provisional application No. 61/873,758, filed on Sep. 4, 2013, provisional application No. 61/898,462, filed on Oct. 31, 2013, provisional application No. 61/811,415, filed on Apr. 12, 2013, provisional application No. 61/886,586, filed on Oct. 3, 2013, provisional application No. 61/952,843, filed on Mar. 13, 2014, provisional application No. 61/873,351, filed on Sep. 3, 2013.

(56) References Cited

U.S. PATENT DOCUMENTS

| | | |
|---|---|---|
| 4,631,676 A | 12/1986 | Pugh |
| 4,876,455 A | 10/1989 | Sanderson et al. |
| 4,879,659 A | 11/1989 | Bowlin et al. |
| 4,893,223 A | 1/1990 | Arnold |
| 4,894,551 A | 1/1990 | Kishimoto et al. |
| 5,038,258 A | 8/1991 | Koch et al. |
| 5,109,435 A | 4/1992 | Lo et al. |
| 5,134,661 A | 7/1992 | Reinsch |
| 5,282,067 A | 1/1994 | Liu |
| 5,434,617 A | 7/1995 | Bianchi |
| 5,454,043 A | 9/1995 | Freeman |
| 5,538,013 A | 7/1996 | Brannon |
| 5,574,511 A | 11/1996 | Yang et al. |
| 5,581,276 A | 12/1996 | Cipolla et al. |
| 5,594,469 A | 1/1997 | Freeman et al. |
| 5,610,674 A | 3/1997 | Martin |
| 5,659,475 A | 8/1997 | Brown |
| 5,691,737 A | 11/1997 | Ito et al. |
| 5,734,590 A | 3/1998 | Tebbe |
| 5,739,797 A | 4/1998 | Karasawa et al. |
| 5,742,263 A | 4/1998 | Wang et al. |
| 5,883,969 A | 3/1999 | Le Gouzouguec et al. |
| 5,900,863 A | 5/1999 | Numazaki |
| 5,901,170 A | 5/1999 | Peysakhovich et al. |
| 5,940,538 A | 8/1999 | Spiegel et al. |
| 5,983,909 A | 11/1999 | Yeol et al. |
| 5,995,770 A | 11/1999 | Rochford et al. |
| 6,002,808 A | 12/1999 | Freeman |
| 6,031,161 A | 2/2000 | Baltenberger |
| 6,031,568 A | 2/2000 | Wakitani |
| 6,031,661 A | 2/2000 | Tanaami |
| 6,072,494 A | 6/2000 | Nguyen |
| 6,075,610 A | 6/2000 | Ueda et al. |
| 6,075,892 A | 6/2000 | Fan et al. |
| 6,075,895 A | 6/2000 | Qiao et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,296,358 B1 | 10/2001 | Cornsweet et al. |
| 6,298,143 B1 | 10/2001 | Kikuchi et al. |
| 6,346,933 B1 | 2/2002 | Lin |
| 6,417,970 B1 | 7/2002 | Travers et al. |
| 6,463,402 B1 | 10/2002 | Bennett et al. |
| 6,492,986 B1 | 12/2002 | Metaxas et al. |
| 6,493,041 B1 | 12/2002 | Hanko et al. |
| 6,498,628 B2 | 12/2002 | Iwamura |
| 6,578,203 B1 | 6/2003 | Anderson, Jr. et al. |
| 6,602,475 B1 | 8/2003 | Chiao |
| 6,603,867 B1 | 8/2003 | Sugino et al. |
| 6,629,065 B1 | 9/2003 | Gadh et al. |
| 6,661,918 B1 | 12/2003 | Gordon et al. |
| 6,674,877 B1 | 1/2004 | Jojic et al. |
| 6,702,494 B2 | 3/2004 | Dumler et al. |
| 6,734,911 B1 | 5/2004 | Lyons |
| 6,738,424 B1 | 5/2004 | Allmen et al. |
| 6,758,215 B2 | 7/2004 | Begum |
| 6,771,294 B1 | 8/2004 | Pulli et al. |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,901,170 B1 | 5/2005 | Terada et al. |
| 6,919,880 B2 | 7/2005 | Morrison et al. |
| 6,931,146 B2 | 8/2005 | Aoki et al. |
| 6,950,534 B2 | 9/2005 | Cohen et al. |
| 6,993,157 B1 | 1/2006 | Oue et al. |
| 7,149,356 B2 | 12/2006 | Clark et al. |
| 7,152,024 B2 | 12/2006 | Marschner et al. |
| 7,213,707 B2 | 5/2007 | Hubbs et al. |
| 7,215,828 B2 | 5/2007 | Luo |
| 7,244,233 B2 | 7/2007 | Krantz et al. |
| 7,257,237 B1 | 8/2007 | Luck et al. |
| 7,259,873 B2 | 8/2007 | Sikora et al. |
| 7,308,112 B2 | 12/2007 | Fujimura et al. |
| 7,333,648 B2 | 2/2008 | Edie et al. |
| 7,340,077 B2 | 3/2008 | Gokturk et al. |
| 7,372,977 B2 | 5/2008 | Fujimura et al. |
| 7,483,049 B2 | 1/2009 | Aman et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |

(56) References Cited

U.S. PATENT DOCUMENTS

| | | | |
|---|---|---|---|
| 7,598,942 B2 | 10/2009 | Underkoffler et al. | |
| 7,606,417 B2 | 10/2009 | Steinberg et al. | |
| 7,646,372 B2 | 1/2010 | Marks et al. | |
| 7,656,372 B2 | 2/2010 | Sato et al. | |
| 7,665,041 B2 | 2/2010 | Wilson et al. | |
| 7,692,625 B2 | 4/2010 | Morrison et al. | |
| 7,831,932 B2 | 11/2010 | Josephsoon et al. | |
| 7,840,031 B2 | 11/2010 | Albertson et al. | |
| 7,861,188 B2 | 12/2010 | Josephsoon et al. | |
| 7,886,229 B2 | 2/2011 | Pachet | |
| 7,886,236 B2 | 2/2011 | Kolmykov-Zotov et al. | |
| 7,940,885 B2 | 5/2011 | Stanton et al. | |
| 7,948,493 B2 | 5/2011 | Klefenz et al. | |
| 7,961,174 B1 | 6/2011 | Markovic et al. | |
| 7,961,934 B2 | 6/2011 | Thrun et al. | |
| 7,971,156 B2 | 6/2011 | Albertson et al. | |
| 7,980,885 B2 | 7/2011 | Gattwinkel et al. | |
| 8,005,263 B2 | 8/2011 | Fujimura et al. | |
| 8,023,698 B2 | 9/2011 | Niwa et al. | |
| 8,035,624 B2 | 10/2011 | Bell et al. | |
| 8,045,825 B2 | 10/2011 | Shimoyama et al. | |
| 8,059,153 B1 | 11/2011 | Barreto et al. | |
| 8,059,894 B1 | 11/2011 | Flagg et al. | |
| 8,064,704 B2 | 11/2011 | Kim et al. | |
| 8,085,339 B2 | 12/2011 | Marks | |
| 8,086,971 B2 | 12/2011 | Radivojevic et al. | |
| 8,107,687 B2 | 1/2012 | Gold, Jr. | |
| 8,111,239 B2 | 2/2012 | Pryor et al. | |
| 8,112,719 B2 | 2/2012 | Hsu et al. | |
| 8,116,527 B2 | 2/2012 | Sabol et al. | |
| 8,144,233 B2 | 3/2012 | Fukuyama | |
| 8,149,210 B2 | 4/2012 | Klier et al. | |
| 8,159,536 B2 | 4/2012 | Wang et al. | |
| 8,180,114 B2 | 5/2012 | Nishihara et al. | |
| 8,185,176 B2 | 5/2012 | Mangat et al. | |
| 8,213,707 B2 | 7/2012 | Li et al. | |
| 8,218,858 B2 | 7/2012 | Gu | |
| 8,229,134 B2 | 7/2012 | Duraiswami et al. | |
| 8,230,852 B2 | 7/2012 | Zhang et al. | |
| 8,235,529 B1 | 8/2012 | Raffle et al. | |
| 8,244,233 B2 | 8/2012 | Chang et al. | |
| 8,249,345 B2 | 8/2012 | Wu et al. | |
| 8,270,669 B2 | 9/2012 | Aichi et al. | |
| 8,289,162 B2 | 10/2012 | Mooring et al. | |
| 8,290,208 B2 | 10/2012 | Kurtz et al. | |
| 8,304,727 B2 | 11/2012 | Lee et al. | |
| 8,319,832 B2 | 11/2012 | Nagata et al. | |
| 8,325,993 B2 | 12/2012 | Dinerstein et al. | |
| 8,363,010 B2 | 1/2013 | Nagata | |
| 8,395,600 B2 | 3/2013 | Kawashima et al. | |
| 8,432,377 B2 | 4/2013 | Newton | |
| 8,471,848 B2 | 6/2013 | Tschesnok | |
| 8,514,221 B2 | 8/2013 | King et al. | |
| 8,553,037 B2 | 10/2013 | Smith et al. | |
| 8,567,395 B2 | 10/2013 | Savona et al. | |
| 8,582,809 B2 | 11/2013 | Halimeh et al. | |
| 8,593,417 B2 | 11/2013 | Kawashima et al. | |
| 8,605,202 B2 | 12/2013 | Muijs et al. | |
| 8,631,355 B2 | 1/2014 | Murillo et al. | |
| 8,638,989 B2 | 1/2014 | Holz | |
| 8,659,594 B2 | 2/2014 | Kim et al. | |
| 8,659,658 B2 | 2/2014 | Vassigh et al. | |
| 8,686,943 B1* | 4/2014 | Rafii | G06F 3/011 345/158 |
| 8,693,731 B2 | 4/2014 | Holz et al. | |
| 8,723,789 B1* | 5/2014 | Rafii | G06F 3/017 345/158 |
| 8,724,906 B2 | 5/2014 | Shotton et al. | |
| 8,738,523 B1 | 5/2014 | Sanchez et al. | |
| 8,744,122 B2 | 6/2014 | Salgian et al. | |
| 8,768,022 B2 | 7/2014 | Miga et al. | |
| 8,773,512 B1* | 7/2014 | Rafii | A63F 13/213 375/240.23 |
| 8,817,087 B2 | 8/2014 | Weng et al. | |
| 8,836,768 B1* | 9/2014 | Rafii | G02B 27/017 348/47 |
| 8,842,084 B2 | 9/2014 | Andersson et al. | |
| 8,843,857 B2 | 9/2014 | Berkes et al. | |
| 8,854,433 B1 | 10/2014 | Rafii | |
| 8,872,914 B2 | 10/2014 | Gobush | |
| 8,878,749 B1 | 11/2014 | Wu et al. | |
| 8,879,835 B2 | 11/2014 | Krishnaswamy et al. | |
| 8,891,868 B1 | 11/2014 | Ivanchenko | |
| 8,907,982 B2 | 12/2014 | Zontrop et al. | |
| 8,922,590 B1 | 12/2014 | Luckett, Jr. et al. | |
| 8,929,609 B2 | 1/2015 | Padovani et al. | |
| 8,930,852 B2 | 1/2015 | Chen et al. | |
| 8,942,881 B2 | 1/2015 | Hobbs et al. | |
| 8,954,340 B2 | 2/2015 | Sanchez et al. | |
| 8,957,857 B2 | 2/2015 | Lee et al. | |
| 9,014,414 B2 | 4/2015 | Katano et al. | |
| 9,056,396 B1 | 6/2015 | Linnell | |
| 9,063,574 B1 | 6/2015 | Ivanchenko | |
| 9,070,019 B2 | 6/2015 | Holz | |
| 9,076,257 B2 | 7/2015 | Sharma et al. | |
| 9,119,670 B2 | 9/2015 | Yang et al. | |
| 9,122,354 B2 | 9/2015 | Sharma | |
| 9,123,176 B2 | 9/2015 | Lu et al. | |
| 9,124,778 B1 | 9/2015 | Crabtree | |
| 9,135,503 B2 | 9/2015 | Sundaresan et al. | |
| 9,153,028 B2 | 10/2015 | Holz | |
| 9,182,812 B2 | 11/2015 | Ybanez Zepeda | |
| 9,182,838 B2 | 11/2015 | Kikkeri | |
| 9,285,893 B2 | 3/2016 | Holz | |
| 9,317,924 B2 | 4/2016 | Aratani et al. | |
| 9,330,313 B2 | 5/2016 | Jung et al. | |
| 9,342,160 B2 | 5/2016 | Bailey et al. | |
| 9,389,779 B2 | 7/2016 | Anderson et al. | |
| 9,392,196 B2 | 7/2016 | Holz | |
| 9,436,288 B2 | 9/2016 | Holz | |
| 9,436,998 B2 | 9/2016 | Holz | |
| 9,459,697 B2 | 10/2016 | Bedikian et al. | |
| 9,495,613 B2 | 11/2016 | Holz et al. | |
| 9,501,152 B2 | 11/2016 | Bedikian et al. | |
| 9,626,591 B2 | 4/2017 | Holz et al. | |
| 9,646,201 B1 | 5/2017 | Horowitz | |
| 9,652,668 B2 | 5/2017 | Holz et al. | |
| 9,672,441 B2 | 6/2017 | Holz et al. | |
| 9,702,977 B2 | 7/2017 | Holz | |
| 9,767,370 B1 | 9/2017 | Lo et al. | |
| 9,927,522 B2 | 3/2018 | Holz | |
| 9,934,580 B2 | 4/2018 | Holz et al. | |
| 9,945,660 B2 | 4/2018 | Holz | |
| 10,007,350 B1 | 6/2018 | Holz et al. | |
| 10,042,430 B2 | 8/2018 | Bedikian et al. | |
| 10,210,382 B2 | 2/2019 | Shotton et al. | |
| 10,228,242 B2 | 3/2019 | Abovitz et al. | |
| 10,281,987 B1 | 5/2019 | Yang et al. | |
| 10,346,685 B2 | 7/2019 | Ding et al. | |
| 10,366,308 B2 | 7/2019 | Holz et al. | |
| 10,395,385 B2 | 8/2019 | Zhou et al. | |
| 10,445,593 B1 | 10/2019 | Mathiesen et al. | |
| 10,445,881 B2 | 10/2019 | Spizhevoy et al. | |
| 10,585,193 B2 | 3/2020 | Holz | |
| 10,607,413 B1 | 3/2020 | Marcolina et al. | |
| 10,656,720 B1 | 5/2020 | Holz | |
| 10,699,155 B2 | 6/2020 | Holz et al. | |
| 10,739,862 B2 | 8/2020 | Bedikian et al. | |
| 11,178,384 B2 | 11/2021 | Nakamura et al. | |
| 11,353,962 B2 | 6/2022 | Bedikian et al. | |
| 11,493,998 B2 | 11/2022 | Holz | |
| 2001/0044858 A1 | 11/2001 | Rekimoto | |
| 2001/0052985 A1 | 12/2001 | Ono | |
| 2002/0008139 A1 | 1/2002 | Albertelli | |
| 2002/0008211 A1 | 1/2002 | Kask | |
| 2002/0021287 A1 | 2/2002 | Tomasi et al. | |
| 2002/0041327 A1 | 4/2002 | Hildreth et al. | |
| 2002/0080094 A1 | 6/2002 | Biocca et al. | |
| 2002/0105484 A1 | 8/2002 | Navab et al. | |
| 2003/0053658 A1 | 3/2003 | Pavlidis | |
| 2003/0053659 A1 | 3/2003 | Pavlidis et al. | |
| 2003/0081141 A1 | 5/2003 | Mazzapica | |
| 2003/0123703 A1 | 7/2003 | Pavlidis et al. | |

(56) References Cited

U.S. PATENT DOCUMENTS

| | | |
|---|---|---|
| 2003/0152289 A1 | 8/2003 | Luo |
| 2003/0202697 A1 | 10/2003 | Simard et al. |
| 2003/0210262 A1 | 11/2003 | Gahm et al. |
| 2004/0103111 A1 | 5/2004 | Miller et al. |
| 2004/0125228 A1 | 7/2004 | Dougherty |
| 2004/0125984 A1 | 7/2004 | Ito et al. |
| 2004/0145809 A1 | 7/2004 | Brenner |
| 2004/0155877 A1 | 8/2004 | Hong et al. |
| 2004/0212725 A1 | 10/2004 | Raskar |
| 2005/0007673 A1 | 1/2005 | Chaoulov et al. |
| 2005/0068518 A1 | 3/2005 | Baney et al. |
| 2005/0094019 A1 | 5/2005 | Grosvenor et al. |
| 2005/0131607 A1 | 6/2005 | Breed |
| 2005/0156888 A1 | 7/2005 | Xie et al. |
| 2005/0168461 A1 | 8/2005 | Acosta et al. |
| 2005/0168578 A1 | 8/2005 | Gobush |
| 2005/0236558 A1 | 10/2005 | Nabeshima et al. |
| 2005/0238201 A1 | 10/2005 | Shamaie |
| 2006/0017807 A1 | 1/2006 | Lee et al. |
| 2006/0028656 A1 | 2/2006 | Venkatesh et al. |
| 2006/0029296 A1 | 2/2006 | King et al. |
| 2006/0033713 A1 | 2/2006 | Pryor |
| 2006/0034545 A1 | 2/2006 | Mattes et al. |
| 2006/0050979 A1 | 3/2006 | Kawahara |
| 2006/0072105 A1 | 4/2006 | Wagner |
| 2006/0098899 A1 | 5/2006 | King et al. |
| 2006/0204040 A1 | 9/2006 | Freeman et al. |
| 2006/0210112 A1 | 9/2006 | Cohen et al. |
| 2006/0262421 A1 | 11/2006 | Matsumoto et al. |
| 2006/0290950 A1 | 12/2006 | Platt et al. |
| 2007/0014466 A1 | 1/2007 | Baldwin |
| 2007/0018966 A1 | 1/2007 | Blythe et al. |
| 2007/0042346 A1 | 2/2007 | Weller |
| 2007/0066394 A1 | 3/2007 | Ikeda et al. |
| 2007/0076224 A1 | 4/2007 | Alexander |
| 2007/0086621 A1 | 4/2007 | Aggarwal et al. |
| 2007/0130547 A1 | 6/2007 | Boillot |
| 2007/0206719 A1 | 9/2007 | Suryanarayanan et al. |
| 2007/0211023 A1 | 9/2007 | Boillot |
| 2007/0230929 A1 | 10/2007 | Niwa et al. |
| 2007/0238956 A1 | 10/2007 | Haras et al. |
| 2007/0268316 A1 | 11/2007 | Kajita et al. |
| 2008/0013826 A1 | 1/2008 | Hillis et al. |
| 2008/0019576 A1 | 1/2008 | Senftner et al. |
| 2008/0030429 A1 | 2/2008 | Hailpern et al. |
| 2008/0031492 A1 | 2/2008 | Lanz |
| 2008/0056752 A1 | 3/2008 | Denton et al. |
| 2008/0059131 A1 | 3/2008 | Tokita et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0111710 A1 | 5/2008 | Boillot |
| 2008/0118091 A1 | 5/2008 | Serfaty et al. |
| 2008/0126937 A1 | 5/2008 | Pachet |
| 2008/0141181 A1 | 6/2008 | Ishigaki et al. |
| 2008/0186475 A1 | 8/2008 | Kawata et al. |
| 2008/0187175 A1 | 8/2008 | Kim et al. |
| 2008/0244468 A1 | 10/2008 | Nishihara et al. |
| 2008/0246759 A1 | 10/2008 | Summers |
| 2008/0273764 A1 | 11/2008 | Scholl |
| 2008/0278589 A1 | 11/2008 | Thorn |
| 2008/0291160 A1 | 11/2008 | Rabin |
| 2008/0300055 A1 | 12/2008 | Lutnick et al. |
| 2008/0304740 A1 | 12/2008 | Sun et al. |
| 2008/0319356 A1 | 12/2008 | Cain et al. |
| 2009/0002489 A1 | 1/2009 | Yang et al. |
| 2009/0093307 A1 | 4/2009 | Miyaki |
| 2009/0102840 A1 | 4/2009 | Li |
| 2009/0103780 A1* | 4/2009 | Nishihara ............. G06F 3/0425 382/103 |
| 2009/0116742 A1 | 5/2009 | Nishihara |
| 2009/0122146 A1 | 5/2009 | Zalewski et al. |
| 2009/0128564 A1 | 5/2009 | Okuno |
| 2009/0153655 A1 | 6/2009 | Ike et al. |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0256817 A1 | 10/2009 | Perlin et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0001998 A1 | 1/2010 | Mandella et al. |
| 2010/0013662 A1 | 1/2010 | Stude |
| 2010/0013832 A1 | 1/2010 | Xiao et al. |
| 2010/0014781 A1 | 1/2010 | Liu et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0053209 A1 | 3/2010 | Rauch et al. |
| 2010/0053612 A1 | 3/2010 | Ou-Yang et al. |
| 2010/0058252 A1 | 3/2010 | Ko |
| 2010/0066676 A1 | 3/2010 | Kramer et al. |
| 2010/0066737 A1 | 3/2010 | Liu |
| 2010/0066975 A1 | 3/2010 | Rehnstrom |
| 2010/0091110 A1 | 4/2010 | Hildreth |
| 2010/0095206 A1 | 4/2010 | Kim |
| 2010/0118123 A1 | 5/2010 | Freedman et al. |
| 2010/0121189 A1 | 5/2010 | Ma et al. |
| 2010/0125815 A1 | 5/2010 | Wang et al. |
| 2010/0127995 A1 | 5/2010 | Rigazio et al. |
| 2010/0141762 A1 | 6/2010 | Siann et al. |
| 2010/0156676 A1 | 6/2010 | Mooring et al. |
| 2010/0158372 A1 | 6/2010 | Kim et al. |
| 2010/0162165 A1 | 6/2010 | Addala et al. |
| 2010/0177049 A1 | 7/2010 | Levy et al. |
| 2010/0177929 A1 | 7/2010 | Kurtz et al. |
| 2010/0194863 A1 | 8/2010 | Lopes et al. |
| 2010/0199221 A1 | 8/2010 | Yeung et al. |
| 2010/0199230 A1 | 8/2010 | Latta et al. |
| 2010/0199232 A1 | 8/2010 | Mistry et al. |
| 2010/0201880 A1 | 8/2010 | Iwamura |
| 2010/0208942 A1 | 8/2010 | Porter et al. |
| 2010/0219934 A1 | 9/2010 | Matsumoto |
| 2010/0222102 A1 | 9/2010 | Rodriguez |
| 2010/0245289 A1 | 9/2010 | Svajda |
| 2010/0248836 A1 | 9/2010 | Suzuki et al. |
| 2010/0264833 A1 | 10/2010 | Van Endert et al. |
| 2010/0275159 A1 | 10/2010 | Matsubara et al. |
| 2010/0277411 A1 | 11/2010 | Yee et al. |
| 2010/0278393 A1 | 11/2010 | Snook et al. |
| 2010/0295772 A1* | 11/2010 | Alameh ............. G06F 3/0304 715/863 |
| 2010/0296698 A1 | 11/2010 | Lien et al. |
| 2010/0302015 A1 | 12/2010 | Kipman et al. |
| 2010/0302357 A1 | 12/2010 | Hsu et al. |
| 2010/0303298 A1 | 12/2010 | Marks et al. |
| 2010/0303298 A1 | 12/2010 | Snook et al. |
| 2010/0306712 A1 | 12/2010 | Snook et al. |
| 2010/0306713 A1 | 12/2010 | Geisner et al. |
| 2010/0309097 A1 | 12/2010 | Raviv et al. |
| 2010/0321289 A1 | 12/2010 | Kim et al. |
| 2010/0321377 A1 | 12/2010 | Gay et al. |
| 2011/0007072 A1 | 1/2011 | Khan et al. |
| 2011/0018795 A1 | 1/2011 | Jang |
| 2011/0025818 A1 | 2/2011 | Gallmeier et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080337 A1 | 4/2011 | Matsubara et al. |
| 2011/0080470 A1 | 4/2011 | Kuno et al. |
| 2011/0080490 A1 | 4/2011 | Clarkson et al. |
| 2011/0093820 A1 | 4/2011 | Zhang et al. |
| 2011/0096033 A1* | 4/2011 | Ko .................. H04M 1/724 345/175 |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0134251 A1 | 6/2011 | Kim et al. |

(56) References Cited

U.S. PATENT DOCUMENTS

| | | |
|---|---|---|
| 2011/0148875 A1 | 6/2011 | Kim et al. |
| 2011/0163976 A1 | 7/2011 | Barnhoefer et al. |
| 2011/0169726 A1 | 7/2011 | Holmdahl et al. |
| 2011/0173204 A1 | 7/2011 | Murillo et al. |
| 2011/0173574 A1 | 7/2011 | Clavin et al. |
| 2011/0176146 A1 | 7/2011 | Alvarez Diez et al. |
| 2011/0181509 A1 | 7/2011 | Rautiainen et al. |
| 2011/0193778 A1 | 8/2011 | Lee et al. |
| 2011/0193939 A1 | 8/2011 | Vassigh et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0231797 A1 | 9/2011 | Huhtala et al. |
| 2011/0234840 A1 | 9/2011 | Klefenz et al. |
| 2011/0243451 A1 | 10/2011 | Oyaizu |
| 2011/0251896 A1 | 10/2011 | Impollonia et al. |
| 2011/0261178 A1 | 10/2011 | Lo et al. |
| 2011/0267259 A1 | 11/2011 | Tidemand et al. |
| 2011/0267344 A1 | 11/2011 | Germann et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304600 A1 | 12/2011 | Yoshida |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2011/0317871 A1 | 12/2011 | Tossell et al. |
| 2012/0038637 A1 | 2/2012 | Marks |
| 2012/0042246 A1 | 2/2012 | Schwesinger et al. |
| 2012/0050157 A1 | 3/2012 | Latta et al. |
| 2012/0062489 A1 | 3/2012 | Andersson et al. |
| 2012/0062558 A1 | 3/2012 | Lee et al. |
| 2012/0065499 A1 | 3/2012 | Chono |
| 2012/0068914 A1 | 3/2012 | Jacobsen et al. |
| 2012/0079421 A1 | 3/2012 | Arriola |
| 2012/0092254 A1 | 4/2012 | Wong et al. |
| 2012/0098744 A1 | 4/2012 | Stinson, III |
| 2012/0105613 A1 | 5/2012 | Weng et al. |
| 2012/0113223 A1 | 5/2012 | Hilliges et al. |
| 2012/0113255 A1 | 5/2012 | Kasuya et al. |
| 2012/0113316 A1 | 5/2012 | Ueta et al. |
| 2012/0127484 A1 | 5/2012 | Kiyose |
| 2012/0133580 A1 | 5/2012 | Kirby et al. |
| 2012/0150650 A1 | 6/2012 | Zahand |
| 2012/0151421 A1 | 6/2012 | Clarkson |
| 2012/0157203 A1 | 6/2012 | Latta et al. |
| 2012/0159380 A1 | 6/2012 | Kocienda et al. |
| 2012/0163675 A1 | 6/2012 | Joo et al. |
| 2012/0167134 A1 | 6/2012 | Hendricks et al. |
| 2012/0176343 A1 | 7/2012 | Holmgren et al. |
| 2012/0194517 A1 | 8/2012 | Izadi et al. |
| 2012/0204133 A1 | 8/2012 | Guendelman et al. |
| 2012/0214594 A1 | 8/2012 | Kirovski et al. |
| 2012/0218263 A1 | 8/2012 | Meier et al. |
| 2012/0223959 A1 | 9/2012 | Lengeling |
| 2012/0236288 A1 | 9/2012 | Stanley |
| 2012/0250936 A1 | 10/2012 | Holmgren |
| 2012/0268410 A1 | 10/2012 | King et al. |
| 2012/0270654 A1 | 10/2012 | Padovani et al. |
| 2012/0274781 A1 | 11/2012 | Shet et al. |
| 2012/0281873 A1 | 11/2012 | Brown et al. |
| 2012/0293667 A1 | 11/2012 | Baba et al. |
| 2012/0309532 A1 | 12/2012 | Ambrus et al. |
| 2012/0314030 A1 | 12/2012 | Datta et al. |
| 2012/0320080 A1 | 12/2012 | Giese et al. |
| 2013/0019204 A1 | 1/2013 | Kotler et al. |
| 2013/0033483 A1 | 2/2013 | Im et al. |
| 2013/0038694 A1 | 2/2013 | Nichani et al. |
| 2013/0044951 A1 | 2/2013 | Cherng et al. |
| 2013/0050425 A1* | 2/2013 | Im ................. G06F 3/0304 348/46 |
| 2013/0063340 A1 | 3/2013 | Mondragon et al. |
| 2013/0086531 A1 | 4/2013 | Sugita et al. |
| 2013/0097566 A1 | 4/2013 | Berglund |
| 2013/0108109 A1 | 5/2013 | Leuck et al. |
| 2013/0120319 A1 | 5/2013 | Givon |
| 2013/0148852 A1 | 6/2013 | Partis et al. |
| 2013/0167092 A1 | 6/2013 | Yu et al. |
| 2013/0181897 A1 | 7/2013 | Izumi |
| 2013/0182077 A1 | 7/2013 | Holz |
| 2013/0182079 A1 | 7/2013 | Holz |
| 2013/0182897 A1 | 7/2013 | Holz |
| 2013/0187952 A1 | 7/2013 | Berkovich et al. |
| 2013/0191911 A1 | 7/2013 | Dellinger et al. |
| 2013/0194173 A1 | 8/2013 | Zhu et al. |
| 2013/0207970 A1 | 8/2013 | Shpunt et al. |
| 2013/0208948 A1 | 8/2013 | Berkovich et al. |
| 2013/0222233 A1 | 8/2013 | Park et al. |
| 2013/0222640 A1 | 8/2013 | Baek et al. |
| 2013/0225999 A1 | 8/2013 | Banjanin et al. |
| 2013/0229508 A1 | 9/2013 | Li et al. |
| 2013/0239059 A1 | 9/2013 | Chen et al. |
| 2013/0241832 A1 | 9/2013 | Rimon et al. |
| 2013/0252691 A1 | 9/2013 | Alexopoulos |
| 2013/0257736 A1 | 10/2013 | Hou et al. |
| 2013/0258140 A1 | 10/2013 | Lipson et al. |
| 2013/0271397 A1 | 10/2013 | Macdougall et al. |
| 2013/0283213 A1 | 10/2013 | Guendelman et al. |
| 2013/0290911 A1 | 10/2013 | Praphul et al. |
| 2013/0296057 A1 | 11/2013 | Gagner et al. |
| 2013/0300831 A1 | 11/2013 | Mavromatis et al. |
| 2013/0307935 A1 | 11/2013 | Rappel et al. |
| 2013/0321265 A1 | 12/2013 | Bychkov et al. |
| 2014/0002365 A1 | 1/2014 | Ackley et al. |
| 2014/0002495 A1 | 1/2014 | Lamb et al. |
| 2014/0010441 A1 | 1/2014 | Shamaie |
| 2014/0015831 A1 | 1/2014 | Kim et al. |
| 2014/0028861 A1 | 1/2014 | Holz |
| 2014/0055352 A1 | 2/2014 | Davis et al. |
| 2014/0055385 A1 | 2/2014 | Duheille |
| 2014/0055396 A1 | 2/2014 | Aubauer et al. |
| 2014/0063055 A1 | 3/2014 | Osterhout et al. |
| 2014/0063060 A1 | 3/2014 | Maiocci et al. |
| 2014/0064566 A1 | 3/2014 | Shreve et al. |
| 2014/0081521 A1 | 3/2014 | Frojdh et al. |
| 2014/0085203 A1 | 3/2014 | Kobayashi |
| 2014/0095119 A1 | 4/2014 | Lee et al. |
| 2014/0098018 A1 | 4/2014 | Kim et al. |
| 2014/0113507 A1 | 4/2014 | Vanzetto |
| 2014/0118255 A1 | 5/2014 | Billerbeck |
| 2014/0125775 A1 | 5/2014 | Holz |
| 2014/0125813 A1 | 5/2014 | Holz |
| 2014/0132738 A1 | 5/2014 | Ogura et al. |
| 2014/0134733 A1 | 5/2014 | Wu et al. |
| 2014/0139425 A1 | 5/2014 | Sakai |
| 2014/0139641 A1 | 5/2014 | Holz |
| 2014/0149754 A1* | 5/2014 | Silva ................. G06F 3/0304 713/300 |
| 2014/0157135 A1 | 6/2014 | Lee et al. |
| 2014/0157209 A1 | 6/2014 | Dalal et al. |
| 2014/0161311 A1 | 6/2014 | Kim |
| 2014/0168062 A1 | 6/2014 | Katz et al. |
| 2014/0168084 A1* | 6/2014 | Burr ................. G06F 3/017 345/156 |
| 2014/0176420 A1 | 6/2014 | Zhou et al. |
| 2014/0177913 A1 | 6/2014 | Holz |
| 2014/0184496 A1 | 7/2014 | Gribetz et al. |
| 2014/0189579 A1 | 7/2014 | Rimon et al. |
| 2014/0192024 A1 | 7/2014 | Holz |
| 2014/0201666 A1 | 7/2014 | Bedikian et al. |
| 2014/0201674 A1 | 7/2014 | Holz |
| 2014/0201683 A1 | 7/2014 | Holz |
| 2014/0201684 A1 | 7/2014 | Holz |
| 2014/0201689 A1 | 7/2014 | Bedikian et al. |
| 2014/0201690 A1 | 7/2014 | Holz |
| 2014/0222385 A1 | 8/2014 | Muenster et al. |
| 2014/0223385 A1 | 8/2014 | Ton et al. |
| 2014/0225826 A1 | 8/2014 | Juni |

(56) References Cited

U.S. PATENT DOCUMENTS

| | | |
|---|---|---|
| 2014/0225918 A1 | 8/2014 | Mittal et al. |
| 2014/0240215 A1 | 8/2014 | Tremblay et al. |
| 2014/0240225 A1 | 8/2014 | Eilat |
| 2014/0248950 A1 | 9/2014 | Tosas Bautista |
| 2014/0249961 A1 | 9/2014 | Zagel et al. |
| 2014/0253512 A1 | 9/2014 | Narikawa et al. |
| 2014/0253785 A1 | 9/2014 | Chan et al. |
| 2014/0258880 A1 | 9/2014 | Holm et al. |
| 2014/0258886 A1 | 9/2014 | Strong |
| 2014/0267098 A1 | 9/2014 | Na et al. |
| 2014/0267666 A1 | 9/2014 | Holz |
| 2014/0282224 A1 | 9/2014 | Pedley |
| 2014/0282274 A1 | 9/2014 | Everitt et al. |
| 2014/0282282 A1 | 9/2014 | Holz |
| 2014/0304665 A1 | 10/2014 | Holz |
| 2014/0307920 A1 | 10/2014 | Holz |
| 2014/0320408 A1 | 10/2014 | Zagorsek et al. |
| 2014/0340311 A1 | 11/2014 | Holz |
| 2014/0344731 A1 | 11/2014 | Holz |
| 2014/0344762 A1 | 11/2014 | Grasset et al. |
| 2014/0364209 A1 | 12/2014 | Perry |
| 2014/0364212 A1 | 12/2014 | Osman et al. |
| 2014/0369558 A1 | 12/2014 | Holz |
| 2014/0375547 A1 | 12/2014 | Katz et al. |
| 2014/0376773 A1 | 12/2014 | Holz |
| 2015/0003673 A1 | 1/2015 | Fletcher |
| 2015/0009149 A1 | 1/2015 | Gharib et al. |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0040040 A1 | 2/2015 | Balan et al. |
| 2015/0054729 A1 | 2/2015 | Minnen et al. |
| 2015/0084864 A1 | 3/2015 | Geiss et al. |
| 2015/0097772 A1 | 4/2015 | Starner |
| 2015/0103004 A1 | 4/2015 | Cohen et al. |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |
| 2015/0153832 A1 | 6/2015 | Krepec |
| 2015/0172539 A1 | 6/2015 | Neglur |
| 2015/0193669 A1 | 7/2015 | Gu et al. |
| 2015/0198716 A1 | 7/2015 | Romano et al. |
| 2015/0205358 A1 | 7/2015 | Lyren |
| 2015/0205400 A1 | 7/2015 | Hwang et al. |
| 2015/0206320 A1 | 7/2015 | Itani et al. |
| 2015/0206321 A1 | 7/2015 | Scavezze et al. |
| 2015/0220150 A1 | 8/2015 | Plagemann et al. |
| 2015/0220776 A1 | 8/2015 | Cronholm |
| 2015/0227795 A1 | 8/2015 | Starner et al. |
| 2015/0234569 A1 | 8/2015 | Hess |
| 2015/0253428 A1 | 9/2015 | Holz |
| 2015/0258432 A1 | 9/2015 | Stafford et al. |
| 2015/0261291 A1 | 9/2015 | Mikhailov et al. |
| 2015/0293597 A1 | 10/2015 | Mishra et al. |
| 2015/0304593 A1 | 10/2015 | Sakai |
| 2015/0309629 A1 | 10/2015 | Amariutei et al. |
| 2015/0323785 A1 | 11/2015 | Fukata et al. |
| 2015/0363001 A1 | 12/2015 | Malzbender |
| 2015/0363070 A1 | 12/2015 | Katz |
| 2016/0012643 A1 | 1/2016 | Kezele et al. |
| 2016/0026255 A1* | 1/2016 | Katz .................... G06F 3/0304 345/156 |
| 2016/0062573 A1 | 3/2016 | Dascola et al. |
| 2016/0086046 A1 | 3/2016 | Holz et al. |
| 2016/0086055 A1 | 3/2016 | Holz et al. |
| 2016/0093105 A1 | 3/2016 | Rimon et al. |
| 2016/0147376 A1 | 5/2016 | Kim et al. |
| 2016/0323564 A1 | 11/2016 | Pacheco et al. |
| 2016/0328022 A1 | 11/2016 | Holz |
| 2016/0378294 A1 | 12/2016 | Wright et al. |
| 2017/0102791 A1 | 4/2017 | Hosenpud et al. |
| 2017/0124928 A1 | 5/2017 | Edwin et al. |
| 2018/0276846 A1 | 9/2018 | Mostafavi |
| 2018/0285923 A1 | 10/2018 | Fateh |
| 2019/0012794 A1 | 1/2019 | Radwin et al. |
| 2019/0019303 A1 | 1/2019 | Siver et al. |
| 2019/0116322 A1 | 4/2019 | Holzerr et al. |
| 2020/0019766 A1 | 1/2020 | Choi et al. |
| 2020/0053277 A1 | 2/2020 | Shin et al. |

FOREIGN PATENT DOCUMENTS

| | | |
|---|---|---|
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| CN | 105308536 A | 2/2016 |
| DE | 4201934 A1 | 7/1993 |
| DE | 10326035 A1 | 1/2005 |
| DE | 102007015495 A1 | 10/2007 |
| DE | 102007015497 B4 | 1/2014 |
| DE | 11 2014 000 441 T5 | 10/2015 |
| EP | 0999542 A1 | 5/2000 |
| EP | 1477924 A2 | 11/2004 |
| EP | 1837665 A2 | 9/2007 |
| EP | 2369443 A2 | 9/2011 |
| EP | 2378488 A2 | 10/2011 |
| GB | 2419433 A | 4/2006 |
| GB | 2480140 A | 11/2011 |
| GB | 2519418 A | 4/2015 |
| JP | H02236407 A | 9/1990 |
| JP | H08261721 A | 10/1996 |
| JP | H09259278 A | 10/1997 |
| JP | 2000023038 A | 1/2000 |
| JP | 2002512069 A | 4/2002 |
| JP | 2002133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |
| JP | 2010060548 A | 3/2010 |
| JP | 2010523948 A | 7/2010 |
| JP | 2011010258 A | 1/2011 |
| JP | 2011065652 A | 3/2011 |
| JP | 2011107681 A | 6/2011 |
| JP | 2011248376 A | 12/2011 |
| JP | 4906960 B2 | 3/2012 |
| JP | 2012527145 A | 11/2012 |
| KR | 20090006825 A | 1/2009 |
| KR | 101092909 B1 | 6/2011 |
| RU | 2422878 C1 | 6/2011 |
| TW | 200844871 A | 11/2008 |
| WO | 9426057 A1 | 11/1994 |
| WO | 2004114220 A1 | 12/2004 |
| WO | 2006020846 A2 | 2/2006 |
| WO | 2007137093 A2 | 11/2007 |
| WO | 2010007662 A1 | 1/2010 |
| WO | 2010032268 A2 | 3/2010 |
| WO | 2010076622 A1 | 7/2010 |
| WO | 2010088035 A2 | 8/2010 |
| WO | 2010138741 A1 | 12/2010 |
| WO | 2010148155 A2 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014113507 A1 | 7/2014 |
| WO | 2014200589 A2 | 12/2014 |

(56) References Cited

FOREIGN PATENT DOCUMENTS

WO 2014208087 A1 12/2014
WO 2015026707 A1 2/2015

OTHER PUBLICATIONS

Cheikh et al., "Multipeople Tracking Across Multiple Cameras", International Journal on New Computer Architectures and Their Applications (IJNCAA), vol. 2, No. 1, 2012, pp. 23-33.
Chung, et al., "Recovering LSHGCs and SHGCs from Stereo," International Journal of Computer Vision, vol. 20, No. 1/2, 1996, pp. 43-58.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
Davis et al., "Toward 3-D Gesture Recognition", International Journal of Pattern Recognition and Artificial Intelligence, vol. 13, No. 03, 1999, pp. 381-393.
Heikkila, J., "Accurate Camera Calibration and Feature Based 3-D Reconstruction from Monocular Image Sequences", Infotech Oulu and Department of Electrical Engineering, University of Oulu, 1997, 126 pages.
Rasmussen, Matihew K., "An Analytical Framework for the Preparation and Animation of a Virtual Mannequin for the Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.
Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.
VCNL4020 Vishay Semiconductors. Datasheet [online]. Vishay Intertechnology, Inc, Doc No. 83476, Rev. 1.3, Oct. 29, 2013 [retrieved Mar. 4, 2014]. Retrieved from the Internet: <www.vishay.com>. 16 pages.
Zenzo et al., "Advantages In Image Segmentation," Image and Vision Computing, Elsevier Guildford, GB, Nov. 1, 1983, pp. 196-210.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/1 0.1007/978-3-642-33783-3 46>.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
Castle et al., Video-rate Localization in Multiple Maps for Wearable Augmented Reality, IEEE dated Jan. 2008, pp. 1-8.
Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.
Cui et al., "Applications of Evolutionary Computing: Vision-Based Hand Motion Capture Using Genetic Algorithm", 2004 [retrieved Jul. 15, 2016], Springer Berlin Heidelberg, vol. 3005 of LNCS, pp. 289-300. Retrieved from the Internet: <http://link.springer.com/chapter/10.1007/978-3-540-24653-4_30>.
Delamarre et al., "Finding Pose of Hand in Video Images: A Stereo-based Approach", Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Dombeck, D., et al., "Optical Recording of Action Potentials with Second-Harmonic Generation Microscopy," The Journal of Neuroscience, Jan. 28, 2004, vol. 24(4): pp. 999-1003.
Forbes, K., et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.
Fukui et al. "Multiple Object Tracking System with Three Level Continuous Processes" IEEE, 1992, pp. 19-27.
Getting-a-read-on-3d-bar-code, Modern Machine Shop, Feb. 15, 2001, Retrieved on [Sep. 15, 2015] Retrieved from <http://www.mmsonline.comlarticles/getting-a-read-on-3d-bar-codes>.
Gorce et al., "Model-Based 3D Hand Pose Estimation from Monocular Video", Feb. 24, 2011 [retrieved Jul. 15, 2016], IEEE Transac Pattern Analysis and Machine Intell, vol. 33, Issue: 9, pp. 1793-1805, Retri Internet: <http://ieeexplore.ieee.org/xpl/logi n .jsp ?tp=&arnu mber=571 9617 &u rl=http%3A %2 F%2 Fieeexplore.ieee.org%2Fxpls%2 Fabs all.jsp%3Farnumber%3D5719617>.
Guo et al., Featured Wand for 3D Interaction, Jul. 2-5, 2007 [retrieved Jul. 15, 2016], 2007 IEEE International Conference on Multimedia and Expo, pp. 2230-2233. Retrieved from the Internet: <http://ieeexplore.ieee.org/xpl/login.jsp?tp=&arnumber=4285129&tag=1&url=http%3A%2F%2Fieeexplore.ieee.org%2Fxpls%2Fabs_all.jsp%3Farnumber%3D4285129%26tag%3D1>.
Kalkofen et al., "Comprehensible Visualization for Augmented Reality", IEEE Transactiosn on Visuallization and Computer Graphics, 12 page, vol. 15, No. 2. Mar./Apr. 2009.
Kanhangad, V., et al., "A Unified Framework for Contactless Hand Verification," IEEE Transactions on Information Forensics and Security, IEEE, Piscataway, NJ, US , vol. 6, No. 3, Sep. 1, 2011, pp. 1014-1027.
Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.
Krainin et al. Manipulator and Object Tracking for In Hand Model Acquisition, University of Washington, dated Jul. 2011, pp. 1-8.
Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
Mateos, A Camera Calibration Technique Using Targets of Circular Features, Jan. 2000, uploaded Dec. 12, 2013, [retrieved Sep. 10, 2022], 13 pages, Retrieved: https://www.researchgate.net/publication/250669007 (Year: 2000).
Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.
May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.
Melax et al., "Dynamics Based 3D Skeletal Hand Tracking", May 29, 2013 [retrieved Jul. 14, 2016], Proceedings of Graphics Interface, 2013, pp. 63-70. Retrived from the Internet: <http://dl.acm.org/citation.cfm?id=2532141>.
Mendez, et al., "Importance Masks for Revealing Occluded Objects in Augmented Reality," Proceedings of the 16th ACM Symposium on Virtual Reality Software and Technology, 2 pages, ACM, 2009.
Oka et al., "Real-Time Fingertip Tracking and Gesture Recognition", Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpl/login.jsp?tp=

(56) References Cited

OTHER PUBLICATIONS

&arnumber=1046630&url=http%3A%2F%2Fieeexplore.ieee.org%2Fxpls%2Fabsall.jsp%3Farnumber%3D1046630>.
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.
Palmer, Diffraction Grating Handbook, Newport Corporation, 6th Edition, dated 2005, 54 pages.
Pavlovic, V.I., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.
Schlattmann et al., "Markerless 4 gestures 6 DOF real-time visual tracking of the human hand with automatic initialization", 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.
Search Machine translation: Method For Measuring Roundness Of Round Wire of JP-2010523948-A to Studer, retrieved Sep. 10, 2022, 13 pages. (Year: 2022).
Sundaresan, Aravind, et. al., "Markerless Motion Capture using Multiple Cameras," 2005, 12 pages.
Syeda-Mahmood et al., Recognizing action events from multiple viewpoints, Proceedings IEEE Workshop on Detection and Recognition of Events in Video, pp. 64-72, Jul. 8, 2001 [retrieved Sep. 10, 2022], https://ieeexplore.ieee.org/abstract/document/938868 (Year: 2001).
Texas Instruments, "4-Channel, 12-Bit, 80-MSPS ADC," VSP5324, Revised Nov. 2012, Texas Instruments Incorporated, 55 pages.
Texas Instruments, "QVGA 3D Time-of-Flight Sensor," Product Overview: OPT 8140, Dec. 2013, Texas Instruments Incorporated, 10 pages.
Texas Instruments, "Time-of-Flight Controller (TFC)," Product Overview; OPT9220, Jan. 2014, Texas Instruments Incorporated, 43 pages.
Veldhuis, Henri, et. al., "The 3D Reconstruction of Straight and Curved Pipes using Digital Line Photogrammetry", Mar. 20, 1997, 11 pages.
Villa-Uriol et al., Automatic Creation of Three-Dimensional Avatars, Jan. 2003 [retrieved Jan. 6, 2017], Proceedings of SPIE—IS&T Electronic Imaging, vol. 5013, pp. 14-25. Retrieved from the Internet: http://proceedings.spiedigitallibrary.org/proceeding.aspx?articleid=756080.
Wang et al., "Tracking of Deformable Hand in Real Time as Continuous Input for Gesture-based Interaction", Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.
Wijewickrema et al., Reconstruction of Spheres using Occluding Contours from Stereo Images, Aug. 20-24, 2006 [retrieved Jul. 10, 2017], 18th International Conference on Pattern Recognition 2006, pp. 1-4. Retrieved from the Internet:[ http://ieeexplore.ieee.org/abstract/document/1698855/].
Wu, Y., et al., "Vision-Based Gesture Recognition: A Review," Beckman Institute, Copyright 1999, pp. 103-115.
Zhang et al., A Wearable Goggle Navigation System for Dual-Mode Optical and Ultrasound Localization of Suspicious Lesions:Validation Studies Using Tissue-Simulating Phantoms and an Ex Vivo Human Breast Tissue Model, PLOS One, dated Jul. 1, 2016, 16 pages.
Zhao et al., "Combining Marker-Based Mocap and RGB-D Camera for Acquiring High-Fidelity Hand Motion Data", Jul. 29, 2012 [retrieved Jul. 15, 2016], Proceedings of the ACM SIGGRAPH/Eurographics Symposium on Computer Animation, pp. 33-42, Retrieved from the Internet: <http://dl.acm.org/citation.cfm?id=2422363>.

\* cited by examiner

ALT: MULTI-LENS

ALT: IMAGE DIRECTING FILM

ALT: MULTIPLE ELEMENTS ON DIE

ALT: STRUCTURED LIGHT

ALT: MULTI-LENS

ALT: IMAGE DIRECTING FILM

ALT: MONO OR STEREOSCOPIC

ALT: INTERLEAVED

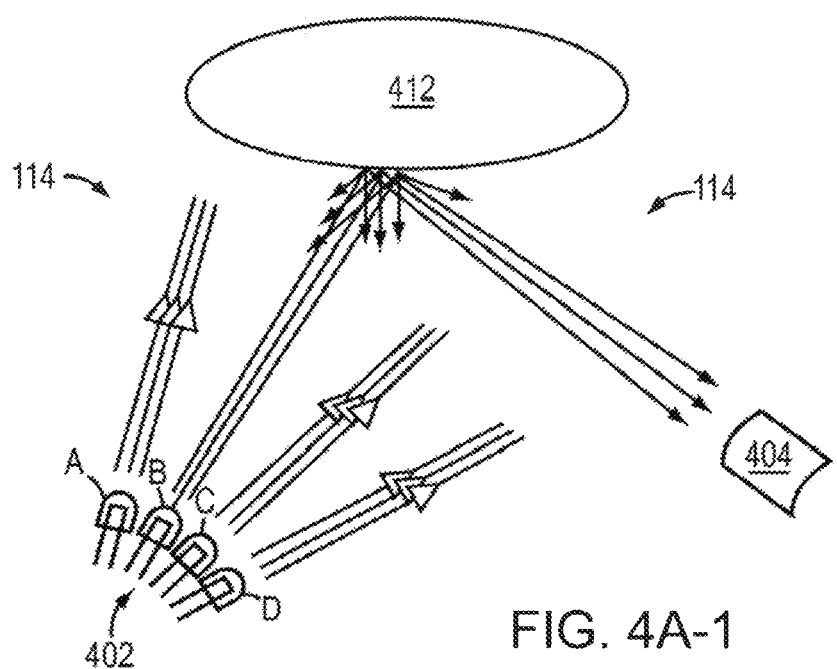
FIG. 4A-1
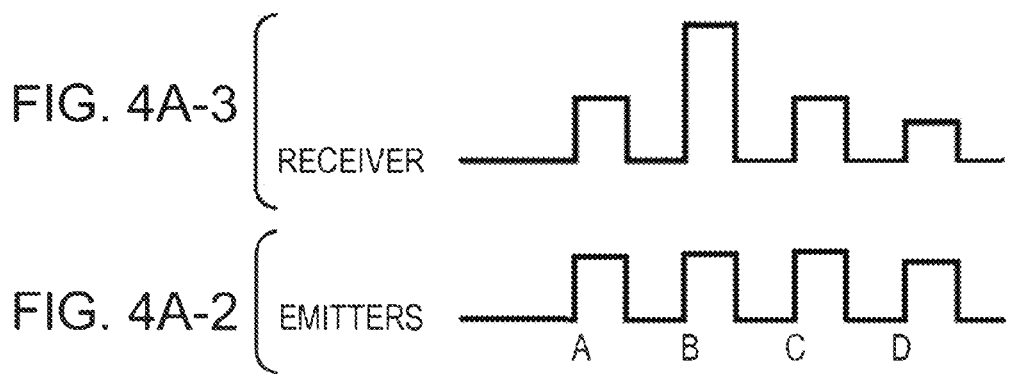
FIG. 4A-3 RECEIVER
FIG. 4A-2 EMITTERS
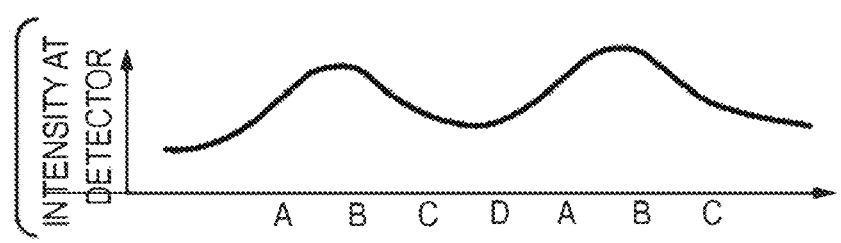
FIG. 4A-4
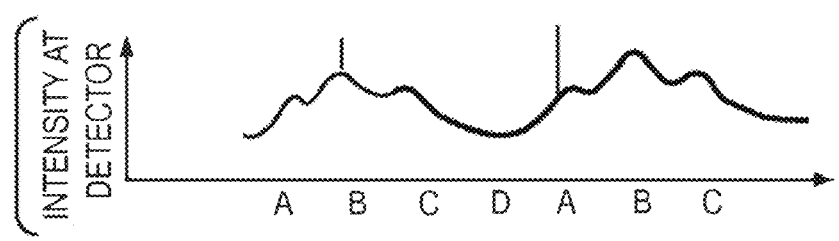
FIG. 4A-5

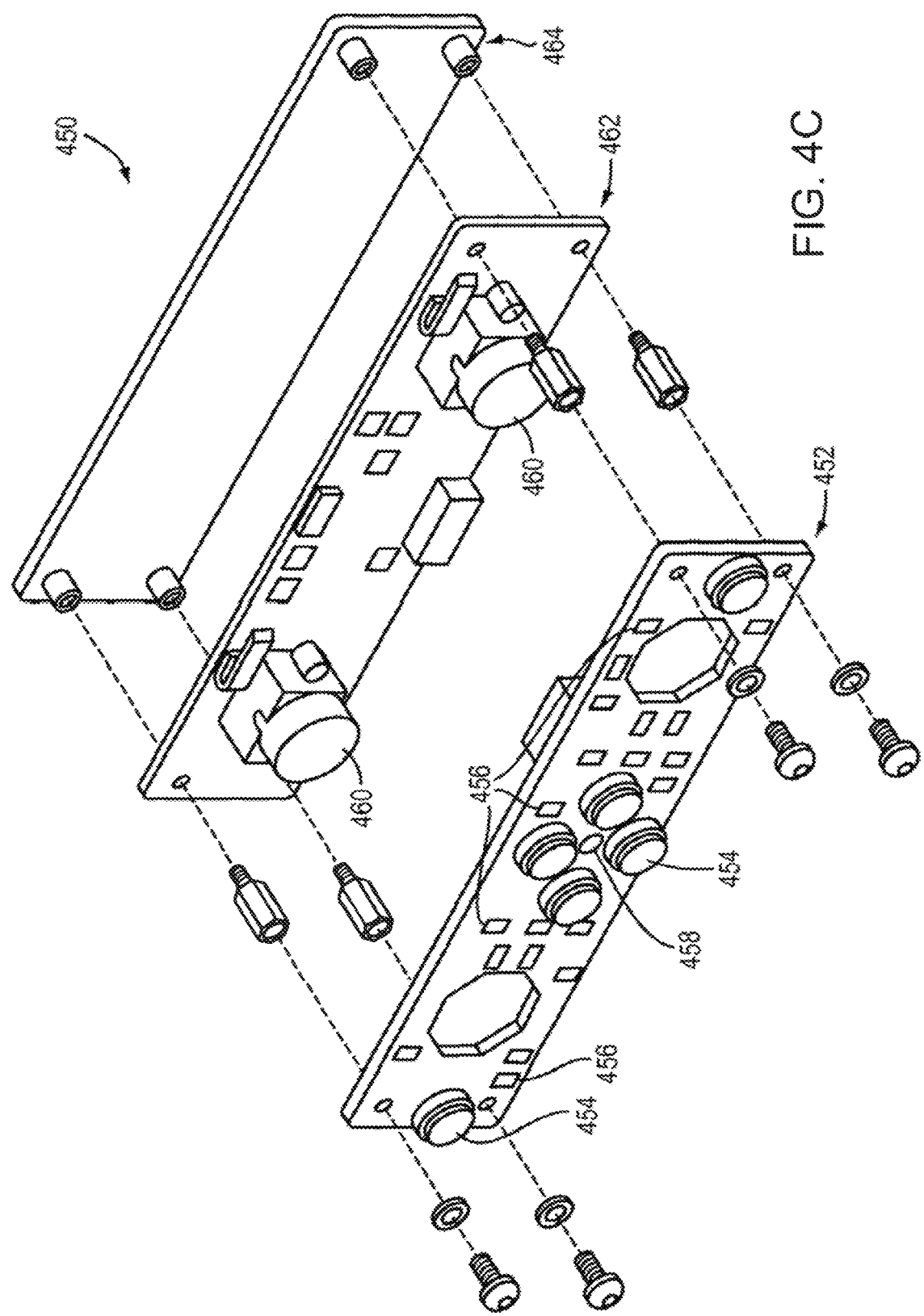

SYSTEMS AND METHODS FOR MACHINE CONTROL

CROSS-REFERENCE TO RELATED APPLICATIONS

This application is a continuation of U.S. application Ser. No. 16/908,643, filed 22 Jun. 2020, which is a continuation of U.S. application Ser. No. 15/696,086, filed 5 Sep. 2017, which is a continuation of Ser. No. 15/392,920, filed 28 Dec. 2016 now U.S. Pat. No. 9,778,752 issued 3 Oct. 2017, which is a continuation of U.S. patent application Ser. No. 14/280,018, filed May 16, 2014 now U.S. Pat. No. 9,679,215 issued 13 Jun. 2017, which is a continuation-in-part of: (i) U.S. patent application Ser. No. 14/106,140, filed on Dec. 13, 2013 now U.S. Pat. No. 9,153,028 issued on Oct. 6, 2015 (which is a continuation of U.S. patent application Ser. No. 13/742,953, filed on Jan. 16, 2013, now U.S. Pat. No. 8,638,989, issued on Jan. 8, 2014, which is a continuation-in-part of (a) U.S. patent application Ser. No. 13/414,485 (filed on Mar. 7, 2012), which claims priority to and the benefit of U.S. Provisional Patent Application No. 61/587,554 (filed on Jan. 17, 2012) and (b) U.S. patent application Ser. No. 13/724,357 (filed on Dec. 21, 2012 and now U.S. Pat. No. 9,070,019 issued Jun. 30, 2015), which claims priority to and the benefit of U.S. Provisional Patent Application No. 61/724,091 (filed on Nov. 8, 2012)); (ii) U.S. patent application Ser. No. 14/212,485, filed on Mar. 14, 2014 (which claims priority to U.S. Provisional Application Nos. 61/792,025, 61/800,327, and 61/801,479, each filed on Mar. 15, 2013); (iii) U.S. patent application Ser. No. 14/154,730, filed on Jan. 14, 2014 and issued as U.S. Pat. No. 9,501,152 on Nov. 22, 2016 (which claims priority to (a) U.S. Provisional Patent Application Nos. 61/825,515 and 61/825,480, both filed on May 20, 2013, (b) U.S. Provisional Patent Application No. 61/873,351, filed on Sep. 3, 2013 and 61/877,641, filed on Sep. 13, 2013, (c) U.S. Provisional Patent Application No. 61/816,487, filed on Apr. 26, 2013, (d) U.S. Provisional Patent Application No. 61/824,691, filed on May 17, 2013, (e) U.S. Provisional Patent Application Nos. 61/752,725, 61/752,731, and 61/752,733, all filed on Jan. 15, 2013, (f) U.S. Provisional Patent Application No. 61/791,204, filed on Mar. 15, 2013, (g) U.S. Provisional Patent Application Nos. 61/808,959 and 61/808,984, both filed on Apr. 5, 2013 and (h) U.S. Provisional Patent Application No. 61/872,538, filed on Aug. 30, 2013; and (iv) U.S. patent application Ser. No. 14/250,758, filed on Apr. 11, 2014 (which claims priority to and the benefit of U.S. Provisional Patent Application No. 61/811,415, filed on Apr. 12, 2013). U.S. patent application Ser. No. 14/280,018 also claims priority to and the benefit of U.S. Provisional Patent Application No. 61/886,586, filed on Oct. 3, 2013, U.S. Provisional Patent Application No. 61/871,790, filed Aug. 29, 2013, U.S. Provisional Patent Application No. 61/873,758, filed on Sep. 4, 2013, U.S. Provisional Patent Application No. 61/898,462, filed on Oct. 31, 2013 and U.S. Provisional Patent Application No. 61/952,843 filed on Mar. 13, 2014. U.S. patent application Ser. No. 13/724,357 now U.S. Pat. No. 9,070,019 issued 30 Jun. 2015 is also a continuation-in-part of U.S. patent application Ser. No. 13/414,485. All foregoing applications are hereby incorporated herein by reference in their entireties.

TECHNICAL FIELD

Embodiments relate generally to machine user interfaces, and more specifically to the use of machine-acquired sensory inputs to formulate control input to machines.

BACKGROUND

Conventional machine interfaces generally require users to provide input mechanically, typically via one or more switches. The keys of a computer keyboard or the buttons on a computer mouse, for instance, are obviously switches. Even a tablet touch screen is at its core a collection of switches, arranged in an array that facilitates locating the point or region of touch based on the subset of switches that are being activated. Beyond just user interfaces for personal computers and consumer electronics, machine interfaces used in industrial, medical, and military contexts, such as robot teach pendants or input devices for computer-assisted surgery, likewise rely on contact-based control input via switches or similar mechanical input elements. Unfortunately, such reliance on physical contact and operation of switches severely limits not only the machine user's freedom to move about, but also the realm of types of user input that are possible. Therefore, an alternative user-interface approach that remedies the shortcomings of traditional interfaces by providing greater flexibility is needed.

SUMMARY

Aspects of the systems and methods described herein provide for improved image- and sensory-signal-based machine interactivity and/or communication by interpreting the position and/or motion of an object (including objects having one or more articulating members, e.g., hands, but more generally any moving parts of humans and/or animals and/or machines) acquired through various machine sensory mechanisms. Among other aspects, embodiments can enable automatically (e.g., programmatically) determining command information (including command information to the sensory system itself, e.g., indicating the manner of further scanning or other sensory data acquisition) using inputs detected from positional information (e.g., position, volume, and/or surface characteristics) and/or motion information (e.g., translation, rotation, deformation and/or other structural change) of a portion of a hand or other detectable object moving in free space. In some embodiments, this is based upon scanning a scene to detect variations that might indicate a presence, position and/or variation (conformations, deformations, translations, rotations, or other object state changes) of a control object portion. Scanning can be performed according to coarse as well as refined scanning patterns and/or intermixed with capturing of images and/or other sensory data capture. Inputs can be interpreted from scan(s), image(s) and/or other sensory data in conjunction with providing command information, machine input, commands, communications and/or other user-machine interfacing, gathering information about objects, events and/or actions existing or occurring within an area being explored, monitored, or controlled, and/or combinations thereof.

In various embodiments, a scene is scanned with a moving directed emission of light or other electromagnetic radiation (e.g., a light beam "sweeping" the scene), or multiple sequentially activated emissions in generally different directions, in accordance with a scan pattern, and reflections of the light off any objects within the scanned region are detected with one or more photosensors (e.g., a collection of sensors such as a camera). Once the presence of an object has been detected based on its reflection signal, a second scan may be performed, typically at a higher resolution and optionally limited to a reduced scan field surrounding the object, to obtain more detailed information about the object or a portion thereof, e.g., to determine its three-dimensional shape and configuration. Subsequent scans may be used to track motions, deformations, and other state changes of the object or object portion. Alternatively to using refined scans (or additionally), detailed object information may be determined by imaging the region with one or more cameras. For instance, images of the object acquired simultaneously by two or more cameras from different vantage points may be analyzed to reconstruct the three-dimensional shape of the object surface. Conversely, in some embodiments, an (e.g., low-resolution) image of a region of interest may be acquired initially to detect objects within the region, and upon such detection, subsequent higher-resolution images or reflections created through scans of the region or object may be acquired to obtain more detailed information about the object. The type(s) of technology (technologies) employed and/or, if applicable, the order in which multiple technologies are employed to detect objects (or object portions) and subsequently determine object attributes (such as a position, orientation, shape, configuration, or parameters of motion or deformation, etc.) depends on the performance characteristics of the technologies (e.g., spatial and/or temporal resolution of the acquired data, responsiveness to changes in the monitored region, complexity and cost of the technology, reliability and robustness of detection algorithms, etc.) and the particular application (e.g., motion tracking, identification, gesture recognition, etc.). Combining a fast scan of the scene with subsequent image-based object tracking, for instance, may advantageously facilitate monitoring a large region in real-time with limited computational resources while providing a wealth of information once an object has been detected.

Accordingly, among other aspects, a computer implemented method for conducting machine control is provided by conducting scanning of a region of space. Scanning can include directing at least two emission cycles to form at least two scan patterns from an emission region to a region of space that might include a control object. Emissions can be cyclical (e.g., repeated) and in accordance to one or more scan patterns directing a sequence, or pattern of activating emissive elements during the emission. Directing can be achieved by a first power state variance at a first light emitter at least partially concurrent with second power state variance at a second light emitter. Alternatively, directing can be achieved by extinguishing a first light emitter completely before activating a second light emitter. An emission region includes a first emission point and a second emission point rotationally pivot-able about one or more axes having an origin point within the emission region. The first emission point can be the same as, or different from, the second emission point.

A reflectance of the at least two scan patterns is detected. Detecting can be achieved by detecting the reflectance with at least one suitable photo-sensitive element, capturing an image with at least one suitable photo-sensitive array element, or combinations thereof. When determined that the detected reflectance indicates a presence of an object in the region of space, a first object attribute set of one or more object attributes of the object is determined for a first one of the at least two scan patterns and a second object attribute set of one or more object attributes of the object is determined for a second one of the at least two scan patterns.

Analyzing the first object attribute set and the second object attribute set enables a system to determine a potential control portion of the object (e.g., a finger-tip of a hand, working-tip of a tool, etc.). In one implementation, analyzing first and second object attribute sets includes finding a known feature. In one implementation, finding a known feature includes identifying characteristics of the object corresponding to characteristics common to features of control portions of determining a reflector affixed to the object. In one implementation, the determining object attribute set includes, in addition to detecting the at least two scan patterns, capturing at least one image with an imaging system including at least one camera.

Comparing the first object attribute set and the second object attribute set can determine control information (e.g., command information including command(s) to a machine or system under control, command(s) to a system conducting the scanning to change one or more parameters of the scanning, other command information such as permissions, authorization, and so forth, or combinations thereof). Accordingly, the indicated control information can be responded to according to response criteria. A response criteria can include determining whether to respond to the control information.

Object attributes can be attributes of the control portion of the object when a control portion is identified. Control portions can inherit certain ones of the object attributes thereby becoming associated with control portion attributes. Control portions can have control portion attributes in addition to the control portion attributes inherited from the object attributes (e.g., finger-tip pointing up or down, etc.). Accordingly, comparing the first object attribute set and the second object attribute set can include comparing control portion attributes selected from the first set with control portion attributes selected from the second set.

An emission cycle can be directed in a first scan pattern and first and second sets of one or more object attributes can be determined by conducting a second scanning in a second pattern. The second scan pattern can be more refined than the first scan pattern. Accordingly, the refined scan pattern captures surface detail about the control object not otherwise captured by a less refined scan pattern. In one implementation, determining first and second sets of one or more object attributes can include determining control-portion attributes based at least in part on captured surface detail about the object. Comparing the first object attribute set with the second object attribute set to determine control information can be achieved by comparing differences in captured surface detail of control portion(s) of the object from control portion attributes of the first scan and the second scan to determine a change indicating control information. For example, determining a change indicating control information can be determining whether an engagement gesture has occurred. In another example, determining a change indicating control information can be determining whether a prospective user has come into vicinity of a machine under control. In a further example, determining a change indicating control information can be determining whether an object is there or not present. In a yet further example, determining a change indicating control information can be determining a correction to control information by comparing the control information to a prior determined control information.

In one implementation, the directing is configured to cause a light emission pattern of a first light emitter to interfere or to create an interference pattern with a light emission pattern of a second light emitter.

In another aspect, a computer implemented method for conducting machine control includes monitoring a region of space for a presence of an object using a first sensing modality. Upon detection of the presence of an object, using a second sensing modality, first and second sets of object attributes are determined for the object. For example, monitoring the region using the first sensing modality can include scanning the region with an emission and detecting a reflectance, and using the second sensing modality comprises acquiring images of the region. Alternatively, monitoring the region using the first sensing modality can include acquiring images of the region, and using the second sensing modality comprises scanning the region with an emission and detecting a reflectance. Comparing the first object attribute set and the second object attribute set enables a system to determine control information. A system under control can respond to the indicated control information according to response criteria.

In a further aspect, a system for conducting machine control includes an emission module for directing an emission cycle to a region of interest in accordance with a scan pattern. A detection module provides (i) detecting a time-variable signal indicative of reflection of the emission by an object in the region of interest, and (ii) acquiring images of the region of interest. For example, the detection module can include one or more cameras for acquiring the images of the region of interest. Additionally, the detection module can include a photosensitive element for detecting a reflection. Additionally, the detection module further comprises circuitry for extracting the time-variable signal from the reflection. A controller provides coordinating operation of the emission and detection modules. A computational facility for processing the reflection signal and the images to determine therefrom a presence of the object and object attributes associated therewith, and for inferring machine-control information from the object attributes.

Advantageously, some embodiments can enable improved machine interfacing and sensory capabilities using "free-space" (i.e., not requiring physical contact) interfacing with a variety of machines. In some embodiments, scanning performed according to coarse as well as refined scanning patterns, and/or intermixed with image capture and/or other sensory data capture, can provide enhanced sensory input acquisition by machines. In fact, some embodiments can provide improvements to their own sensory capabilities by providing command information to the sensory system itself. For example, in embodiments, a sensory acquisition system can indicate to itself a manner for further scanning or other sensory data acquisition. Some embodiments can indicate to themselves improvements in the manner of interpreting scanning or sensory data. Inputs interpreted from scan(s), image(s) and/or other sensory data can provide command information, machine input, commands, communications and/or other user-machine interfacing, gathering information about objects, events and/or actions existing or occurring within an area being explored, monitored, or controlled, and/or combinations thereof.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIG. 4A-1 illustrates a machine sensory and control system providing scanning functionality in accordance with various embodiments;

FIGS. 4A-2 and 4A-3 illustrate light emission and detection intensities, respectively, for an exemplary binary control scheme of the scanning system of FIG. 4A-1;

FIGS. 4A-4 and 4A-5 illustrate light detection intensities for an exemplary continuous control schemes of the scanning system of FIG. 4A-1;

FIG. 4B-1 illustrates a machine sensory and control system providing image-based sending functionality in accordance with various embodiments;

FIGS. 4B-2 and 4B-3 conceptually illustrate reconstruction of a cross-section of a control object using the image-based sensing system of FIG. 4B-1;

FIG. 4C illustrates a device integrating scanning and image-based sensing functionality in accordance with one embodiment;

DETAILED DESCRIPTION

Techniques described herein can be implemented as one or a combination of methods, systems or processor-executed code to form embodiments capable of improved control of machines or other computing resources based at least in part upon determining whether positions and/or motions of a control object (e.g., hand, tool, hand and tool combinations, other detectable objects or combinations thereof) might be interpreted as an interaction with one or more virtual objects. Embodiments can enable modeling of physical objects, created objects and interactions with combinations thereof for machine control or other purposes.

Figure 1:
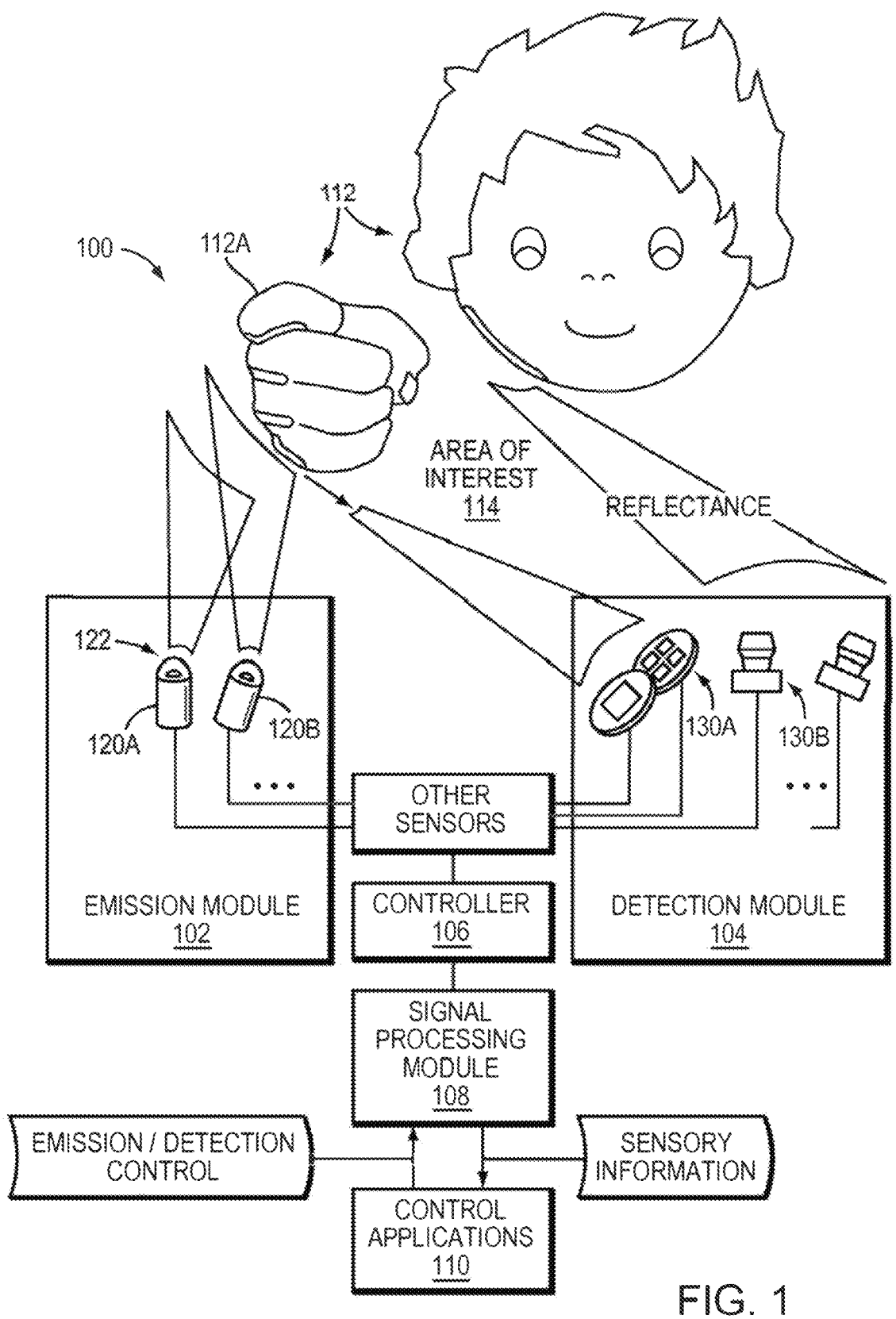
FIG. 1 illustrates an example machine sensory and control system in embodiments.

FIG. 1 illustrates an exemplary machine sensory and control system in embodiments. In one embodiment, a motion-sensing and controller system provides for detecting that some variation(s) in one or more portions of interest of a user (or other object) has occurred, for determining that an interaction with one or more machines corresponds to the variation(s), for determining whether the interaction should occur, and, if so, for affecting the interaction. The machine sensory and control system (MSCS) typically includes a portion-detection system, a variation-determination system, an interaction system, and an application-control system.

Figure 2A:
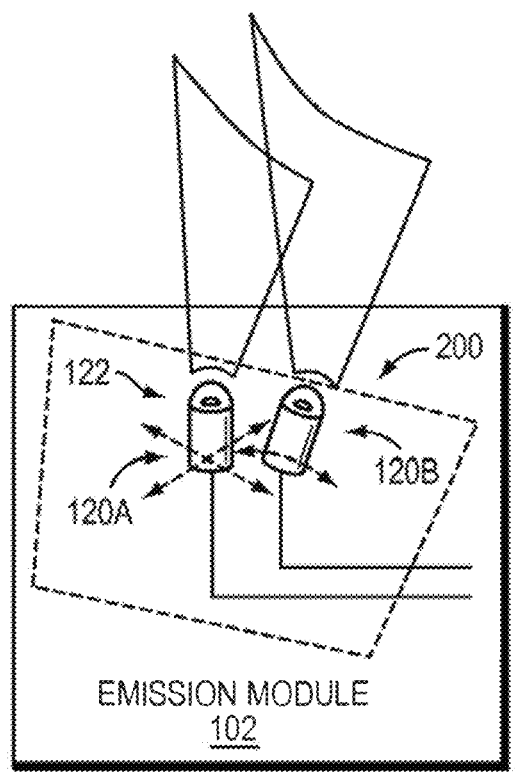
FIGS. 2A, 2B, 2C, 2D and 2E illustrate example emission components of the machine sensory and control system of FIG. 1, in accordance with various embodiments.
Figure 2B:
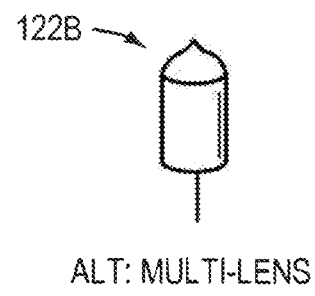
Figure 2C:
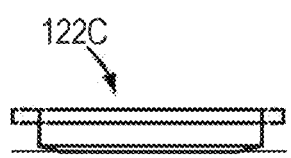
Figure 2D:
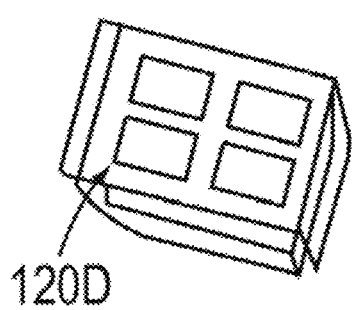
Figure 2E:
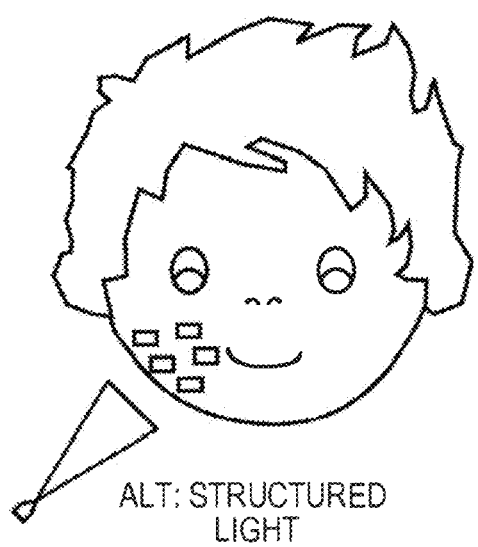
Figure 3A:
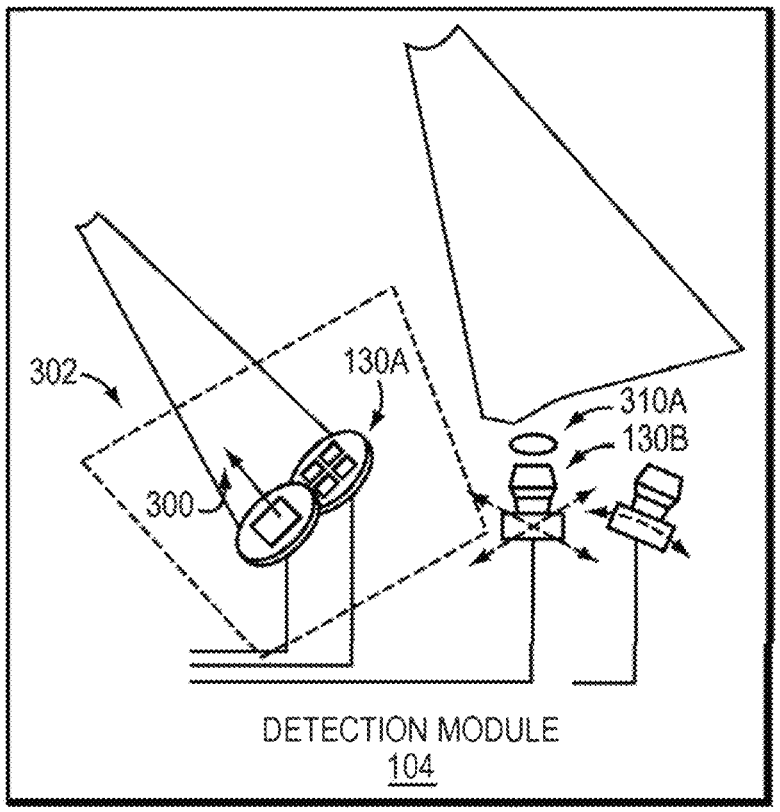
FIGS. 3A, 3B, 3C, 3D, and 3E illustrate example detector components of the machine sensory and control system of FIG. 1, in accordance with various embodiments.
Figure 3B:
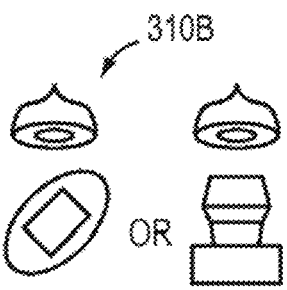
Figure 3C:
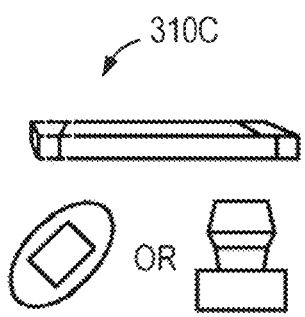
Figure 3E:
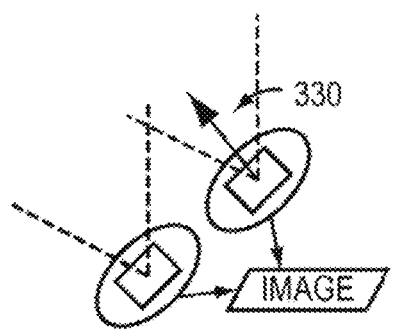
Figure 3D:
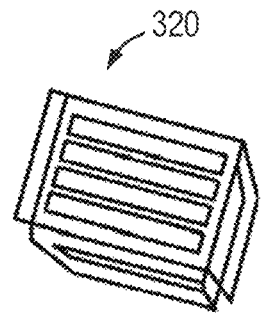

The detection system may detect and capture positional and/or motion information about a control object based on light reflected or scattered by the object. In some embodiments, reflections of ambient light by the object suffice for object detection; in alternative embodiments, the system includes one or more light sources for actively illuminating a region of interest and the object(s) therein. For example, as FIG. 1 shows, one embodiment of detection system 100 includes an emission module 102, a detection module 104, a controller 106, a processing module 108, and a machine-control module interface 110. The emission module 102 illuminates one or more objects of interest 112 (e.g., the user's finger or some other control object) within an area of interest 114. In one embodiment, the emission module 102 includes one or more emitter(s) 120A, 120B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, and so forth) by the controller 106. However, other existing/emerging emission mechanisms and/or some combination thereof can also be utilized in accordance with the requirements of a particular implementation. The emitters 120A, 120B can be individual elements coupled with materials and/or devices 122. For instance, a light-emitting element 120A, 120B may be combined with a lens 122A (see FIG. 2A), multi-lens 122B (see FIG. 2B), image-directing film (IDF) 122C (see FIG. 2C), liquid lens, multiple such elements or combinations thereof, and/or others, with varying or variable optical properties to direct the emission. Further information about image directing films can be found in U.S. Provisional Patent Application No. 61/886,586, filed Oct. 3, 2013), the entire disclosure of which is hereby incorporated by reference. Further, as shown in FIG. 2D, one or more arrays 120D of emissive elements (combined on a die or otherwise) may be used with or without the addition of devices 122 for directing the emission, and positioned within an emission region 200 (see FIG. 2A) according to one or more emitter parameters (e.g., statically mounted (e.g., fixed, parallel, orthogonal or forming other angles with a work surface, one another or a display or other presentation mechanism), dynamically mounted (e.g., pivotable, rotatable and/or translatable), embedded (e.g., within a machine or machinery under control) or otherwise coupleable using an interface (e.g., wired or wireless). Arrays of emissive elements can be implemented together as vertical cavity surface emitting laser (vcsel) elements, such that portions of the array can be illuminated selectively to enable illuminating areas of interest (e.g., containing objects) within the region of interest for power savings or other operational criteria. In some embodiments, illustrated in FIG. 2E, structured lighting techniques can provide improved surface-feature-capture capability by casting illumination according to a reference pattern onto the object. Image-capture techniques described in further detail herein can be applied to capture and analyze differences in the reference pattern and the pattern as reflected by the object. In yet further embodiments, the detection system 100 may omit the emission module 102 altogether (e.g., in favor of ambient lighting).

With renewed reference to FIG. 1 and further reference to FIGS. 3A-3E, in one embodiment, the detection module 104 includes one or more capture device(s) 130A, 130B (e.g., e.g., devices sensitive to visible light or other electromagnetic radiation) that are controllable via the controller 106. The capture device(s) 130A, 130B can comprise one or more individual image-capture elements 130A or arrays of image-capture elements 130A (e.g., pixel arrays, CMOS or CCD photo sensor arrays, or other imaging arrays) or individual photosensitive elements 130B or arrays of photosensitive elements 130B (e.g., photodiodes, photo sensors, single detector arrays, multi-detector arrays, or other configurations of photo sensitive elements), or combinations thereof. However, other existing/emerging detection mechanisms and/or some combination thereof can also be utilized in accordance with the requirements of a particular implementation.

Capture device(s) 130A, 130B can each define a particular vantage point 300 from which objects 112 within the area of interest 114 are sensed, and can be positioned within a detection region 302 (see FIG. 3A) according to one or more detector parameters (either statically (e.g., fixed, parallel, orthogonal or forming other angles with a work surface, one another, or a display or other presentation mechanism) or dynamically (e.g., pivotably, rotatably, and/or translatably); and mounted, embedded (e.g., within a machine or machinery under control), or otherwise coupleable using a wired or wireless interface). Capture devices 130A, 130B can be coupled with devices and/or materials (such as, e.g., lenses 310A (see FIG. 3A), multi-lenses 310B (see FIG. 3B), image-directing film (IDF) 310C (see FIG. 3C), liquid lenses, combinations thereof, and/or others) with varying or variable optical properties for directing the reflectance to the capture device 130A, 130B for controlling or adjusting resolution, sensitivity, and/or contrast. Capture devices 130A, 130B can be designed or adapted to operate in the IR, visible, or other spectrum regions, or combinations thereof; or alternatively operable in conjunction with radio-and/or other electromagnetic-signal-emitting devices in various applications. Multiple capture devices 130A, 130B can be organized in arrays 320, in which the image capture device(s) can be interleaved by row (see, e.g., FIG. 3D), column, or according to a pattern, or can be otherwise addressable individually or in groups. In an embodiment, capture devices 130A, 130B can capture one or more images for sensing objects 112 and capturing information about the object (e.g., position, motion, and so forth). In embodiments comprising more than one capture device, particular vantage points of capture devices 130A, 130B can be directed to area of interest 114 so that fields of view 330 of the capture devices at least partially overlap. Overlap in the fields of view 330 (see, e.g., FIG. 3E) provides capability to employ stereoscopic vision techniques, including those known in the art, to obtain information from a plurality of images captured substantially contemporaneously.

While illustrated with reference to a particular embodiment in which control of emission module 102 and detection module 104 are co-located within a common controller 106, it should be understood that these control functions may, in alternative embodiments, be implemented in separate hardware components, or may each be distributed over a plurality of components. Controller 106 comprises control logic (implemented in hardware, software, or combinations thereof) to conduct selective activation/de-activation of emitter(s) 120A, 120B in on-off or other activation states or combinations thereof (and/or to control active directing devices) to produce emissions of (e.g., spatiotemporally) varying intensities, e.g., in accordance with a scan pattern which can be directed to scan the area of interest 114. For example, the controller may sequentially activate emitters pointing in different directions. Controller 106 may, similarly, include control logic (implemented in hardware, software or combinations thereof) to conduct selection, activation, and control of capture device(s) 130A, 130B (and/or to control associated active directing devices) to capture images or otherwise sense differences in reflectance or other illumination. Signal-processing module 108 determines whether captured images and/or sensed differences in reflectance and/or other sensor-perceptible phenomena indicate a possible presence of one or more objects of interest 112, such as control objects 112A; the presence of such objects, and/or variations thereof (e.g., in position, shape, etc.), can be used as input to a machine controller via the machine- and application-control module interface 110.

The determination whether an object of interest is present can be made, e.g., based on intensity-based foreground-background discrimination, exploiting the fact that objects of interest are typically to be expected in the image foreground. Further, to discriminate between static foreground objects that are not of interest and a control object, which is typically moving, a static image baseline may be accumulated over a time series of images and subtracted from a current image to identify the moving object. Of course, any kind of motion-detecting image-processing technique may be used alternatively or additionally. In some embodiments, the presence of an object of interest is determined from comparison of the image data, or portions thereof, against a library of image templates for objects of interest; suitable techniques for such template matching include image correlation, block-based matching, edge detection, feature and keypoint extractions, combinations thereof, and others.

In various embodiments, the variation of one or more portions of interest of a user or control object can correspond to a variation of one or more attributes (e.g., position, motion, appearance, surface patterns) of a user's hand or finger(s), points of interest on the hand, a facial portion, etc., or other control objects (e.g., styli, tools), and so on (or some combination thereof) that is detectable by, or directed at, but otherwise occurs independently of the operation of the machine sensory and control system. Thus, for example, the system may be configurable to "observe" ordinary user locomotion (e.g., motion, translation, expression, flexing, deformation, and so on), locomotion directed at controlling one or more machines (e.g., gesturing, intentionally system-directed facial contortion, and so forth), and/or attributes thereof (e.g., rigidity, deformation, fingerprints, veins, pulse rates, and/or other biometric parameters); see, e.g., U.S. Provisional Patent Application No. 61/952,843 (filed on Mar. 13, 2014), the entire disclosure of which is hereby incorporated by reference. In one embodiment, the system provides for detecting that some variation(s) in one or more portions of interest (e.g., fingers, fingertips, or other control surface portions) of a user has occurred, for determining that an interaction with one or more machines corresponds to the variation(s), for determining whether the interaction should occur, and, if so, for at least one of initiating, conducting, continuing, discontinuing, and/or modifying the interaction (and/or a corresponding or related interaction).

The system 100 may facilitate different object-sensing modalities, including, e.g., a scanning modality and/or an image-based sensing modality, as are now described in more detail. FIG. 4A-1 illustrates portions of the system 100 configured for scanning a region of interest 114. Herein, the emission module 402 includes a number (e.g., four in the depicted embodiment) emitters A, B, C, D that point in different directions and thereby illuminate different portions of the region of interest 114. Emissions that intercept an object 112 are reflected, and a portion of the reflection is captured by a detector element, arrangement of detector elements, camera or camera-like device (comprising a pixelated sensor), or other device of the detection module 404.

Figures 1, 4B:
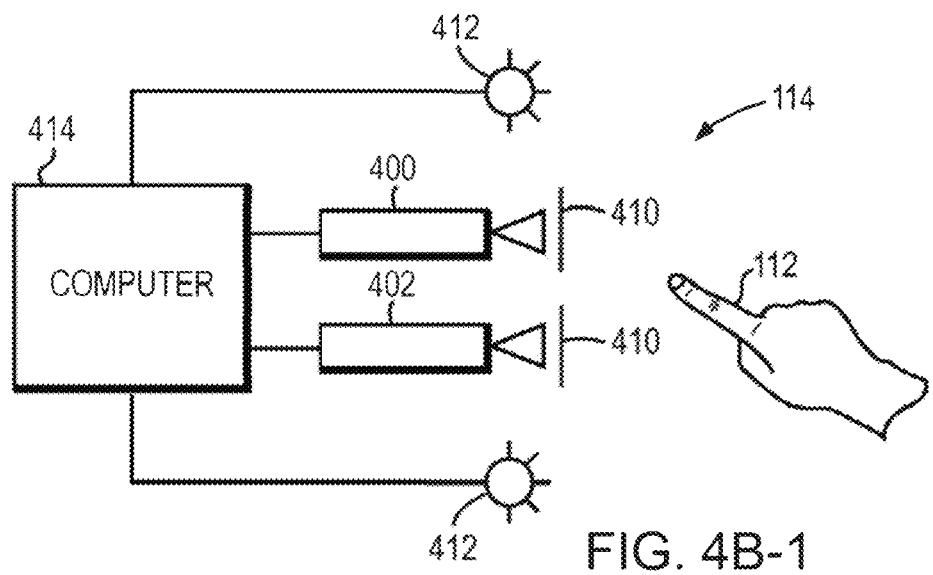
Figures 2, 4B:
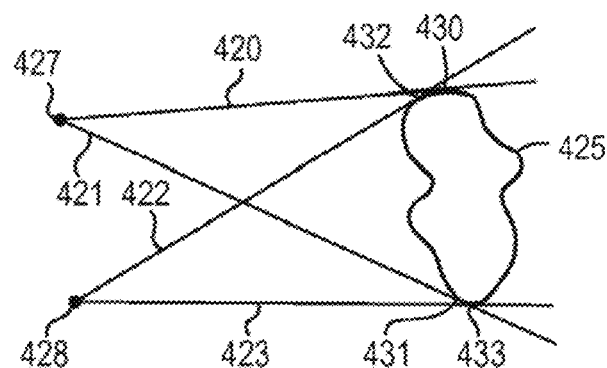
Figures 3, 4B:
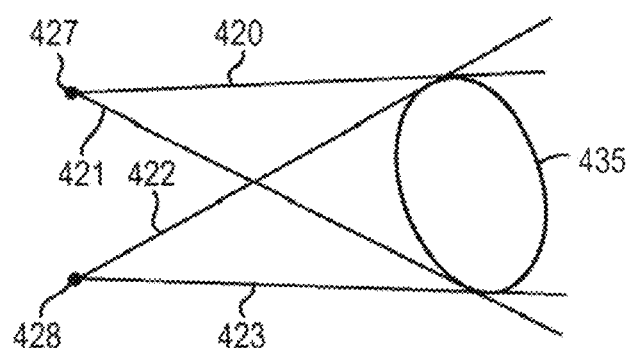

The controller 106 may operate the emitters A, B, C, D sequentially, e.g., in a binary fashion where they are turned on and off one at a time as illustrated in FIGS. 4A-2 and 4A-3. Alternatively, the controller 106 may operate the emitters A, B, C, D in a continuous, gradual fashion where each emitter reaches its intensity maximum at a different point in time; in this case, the emission from one emitter may be completely extinguished before the next emitter is activated, or the emissions of two or more emitters may temporally overlap (e.g., to create a "cross-fade"). In continuous emission mode, the signal intensity received at the reflector likewise varies continuously, resulting either in a single intensity maximum per cycle as illustrated in FIG. 4A-4, or in multiple local maxima with typically one global maximum per cycle as illustrated in FIG. 4A-5. Whether the emission module is operated in binary or continuous mode, the emitter that causes the most direct illumination of the object (emitter B in the depicted embodiment) generally results in the highest-intensity reflection measured by the detector module 104. Thus, by controlling the order in which the emitters are activated (or reach their respective peak emissions) and correlating it to the time-dependent signal received at the detector, locational information about the object 112 can be inferred (e.g., the direction at which the object appears from the standpoint of the emission module may be determined). In some embodiments, the detector module 104 provides additional, independent locational information. For example, if a camera is used, the position of the object 112 within the camera image can be determined. This information, together with the temporal occurrence of the reflection peak in the reflection signal may facilitate computing depth information and determining the three-dimensional location of the object, e.g., based on triangulation.

In some implementations, operating emitters, such as emitters A, B, C, D, at more than one characteristic rates, e.g., the time period to complete single cycle, provides scanning of the region of interest 114 with illumination having different characteristic timing, thereby enabling an interference pattern to be generated by the constructive and destructive interference between the different scan patterns. Constructive interference between the two or more scan patterns can enable a "sweep" of the region of interest by a peak in the interference pattern. The peak in illumination can sweep the region of interest (similar to a light house sweeping the horizon) with a locally concentrated burst of radiant intensity. (Analogously, destructive interference can enable a trough to sweep the region of interest.) In another implementation, a static interference pattern can be cast upon the object 112 in order to enable detecting features of the surface of object 112 by observing distortions in the interference pattern when reflected by the object 112 (see e.g., FIG. 2E).

Various modifications of the emission and detection modules and associated control and signal-processing facilities may be employed. For example, the number and configuration of the individual light emitters may be changed, or a moving (e.g., rotating) emitter, or a stationary emitter in conjunction with a moving (e.g., rotating) deflecting optic or screen, may be used instead of discrete emitters to continuously shift the emission direction across the scene. Further, more complex control schemes of the emission module and, synchronized therewith, the detection module may be used, and detailed information about the relative location and orientation of the emitter and detector elements may be exploited, to increase the amount of information inferable about the object 112. As will be readily appreciated by one of skill in the art, the region of interest 114 may be scanned at various spatial and temporal resolutions, depending on the capabilities of the particular system implementation and the needs of the particular application. For example, a scan may be fine-grained enough to capture surface detail of a person or other control object and may be repeated at sufficient frequency to accurately track movements, deformations, and other state changes. Further detail about systems and methods for scanning-based object detection, reconstruction, and tracking can be found in U.S. patent application Ser. No. 14/212,485, filed on Mar. 14, 2014, which is hereby incorporated herein by reference in its entirety.

FIG. 4B-1 illustrates portions of the system 100 configured for image-based object detection in a region of interest 114. Herein, the detection module 104 includes two (or more) video cameras 400, 402 that acquire a stream of images of the region of interest 114 from two different vantage points (see also FIG. 3E). The cameras 400, 402 may be, e.g., CCD or CMOS cameras, and may operate, e.g., in the visible, infrared (IR), or ultraviolet wavelength regime, either by virtue of the intrinsic sensitivity of their sensors primarily to these wavelengths, or due to appropriate filters 410 placed in front of the cameras 400, 402. In some embodiments, the emission module 102 includes one or more light sources 412 co-located with the cameras 400, 402 for illuminating the region of interest 114 at wavelengths matching the wavelength regime of the cameras 400, 402. For example, the light sources 412 may be LEDs that emit IR light, and the cameras 400, 402 may capture IR light that is reflected off the control object and/or objects in the background. Due to the inverse-square dependence of the illumination intensity on the distance between the light sources 412 and the illuminated object, foreground objects such as the control object 112 generally appear significantly brighter in the images than background objects, aiding in intensity-based foreground/background discrimination. In some embodiments, the cameras 400, 402 and light sources 412 are disposed below the control object to be tracked and point upward. For example, they may be placed on a desk to capture hand motions taking place in a spatial region above the desk, e.g., in front of the screen. This location may be optimal both for foreground/background discrimination (because the background is in this case typically the ceiling and, thus, far away) and for discerning the control object's direction and tip position (because the usual pointing direction will lie, more or less, in the image plane).

The signal processing module 108, which may be implemented, e.g., on a computer 414, may analyze pairs of image frames acquired by the two cameras 400, 402 to identify the control object (or an object including the control object or multiple control objects, such as a user's hand) therein (e.g., as a non-stationary foreground object) and detect its edges and/or other features. The module 108 may analyze corresponding rows in each pair of images to estimate a cross-section of the object based on edge points thereof as seen from the vantage points of the two cameras. In more detail, as shown in FIGS. 4B-2 and 4B-3, tangent lines 420, 421, 422, 423 on the control object 425, extending from the vantage points 427, 428 (where the cameras are located) to the respective edge points 430, 431, 432, 433 of the control object 425 may be defined, and an ellipse 435 (or other geometric shape defined by only a few parameters) may be inscribed therein. Accordingly, the ellipse 435 can serve as a model, obviating the need to conduct processing on the control object 425. This can be advantageous in situations where the control object has complex surface details making it computationally difficult to work with. The cross-sections obtained for multiple adjacent rows of the image pairs may then be computationally connected in a manner that is consistent with certain heuristics and known properties of the control object (e.g., the requirement of a smooth surface) to resolve any ambiguities in the fitted ellipse parameters. As a result, the control object is reconstructed or modeled in three dimensions. This method, and systems for its implementation, are described in more detail in U.S. patent application Ser. No. 13/414,485, filed on Jan. 17, 2012, the entire enclosure of which is incorporated herein by reference. A larger object including multiple control objects can similarly be reconstructed with respective tangent lines and fitted ellipses, typically exploiting information of internal constraints of the object (such as a maximum physical separation between the fingertips of one hand). As described further below, the computer may also extract relevant control object attributes, such as tip positions and orientations as well as velocities, from the three-dimensional model. In some embodiments, this information can be inferred from the images at a lower level, prior to or without the need for fully reconstructing the control object. These operations are readily implemented by those skilled in the art without undue experimentation.

In embodiments that facilitate both scanning and image-based sensing modalities, these modalities may be supported by separate hardware, or include components that are shared between the two modalities. For example, separate detection and emission modules for scanning and imaging may be connected or connectable to the same control module, or certain components of the emission or detection module (e.g., a camera) may be selectively usable in either modality. In some embodiments, components of the emission and detection modules for both modalities, and optionally also the associated control functionality, are integrated into a single unit. For example, scanner hardware may be provided on a daughter board designed for ready integration into a camera-based motion controller; FIG. 4C shows an exemplary implementation 450. Herein, scanning is facilitated by an LED board 452 that has a number of individually controllable LEDs 454, 456 embedded therein. Some, but not necessarily all of the LEDs may have associated focusing optics. In the depicted embodiment, for instance, six LEDs 454 (four of which are arranged at the center and two of which flank the board 452 at the sides) have focusing lenses, and ten additional LEDs 456 (which are arranged in columns of two, three, three, and two LEDs, respectively) are without focusing lenses. The LED board 452 may also include a socket 458 for coupling (e.g., to a photodetector not shown). Two cameras 460 for image-based sensing may be provided in the main board 462 of the device. The main board 462 may also include a processor for basic image processing and/or control of the cameras 460 and/or the LED board 452. The LED board 452 and main board 462 may be secured with threaded fasteners or otherwise mounted on a base plate 464. As will be readily appreciated by one of skill in the art, various modifications of the design shown in FIG. 4C are possible; for example, the number and arrangement of LEDs, photodetectors, and cameras may vary, and/or the scanning and imaging hardware may be integrated on a single board. Advantageously, integrating scanning and image-based sensing capabilities into a single motion controller 450 provides a multi-functionality, yet compact device suitable, e.g., for installation in machines with limited space, such as, e.g., vehicles, appliances, etc.

Figure 5A:
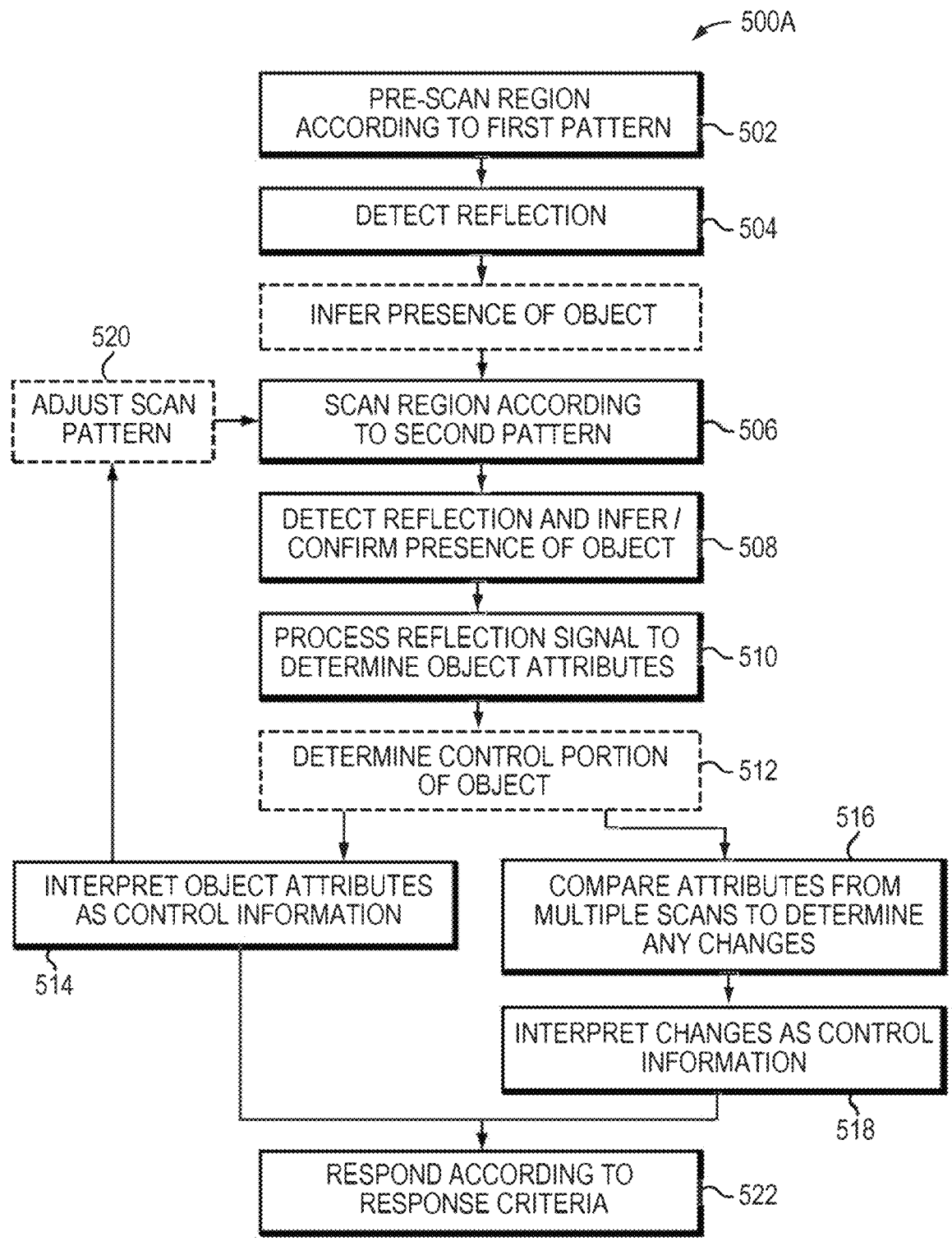
FIG. 5A illustrates a method for detecting and monitoring a control object using at least two scanning patterns in accordance with various embodiments.
Figure 5B:
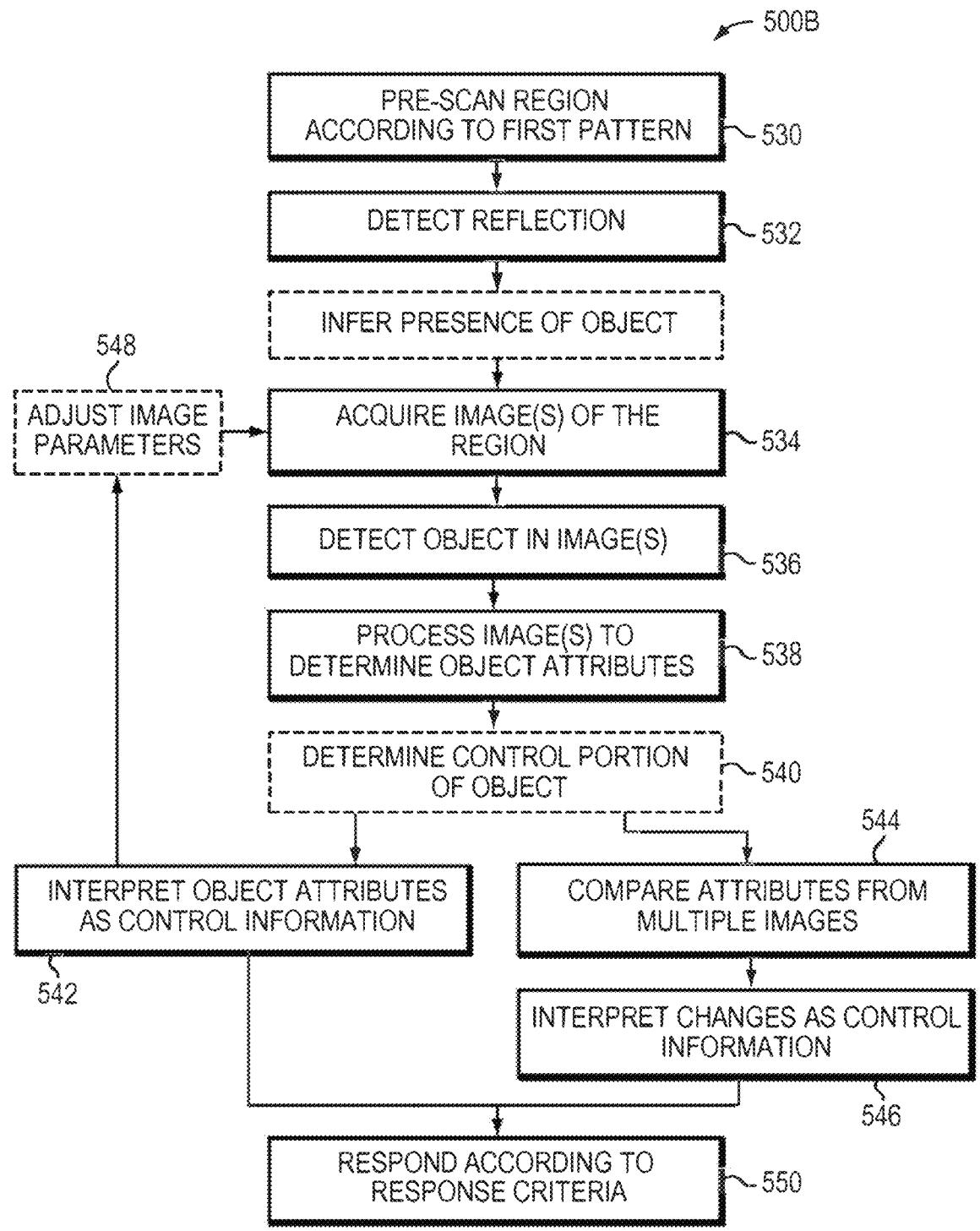
FIGS. 5B and 5C illustrate methods for detecting and monitoring a control object using both scanning and image-based sensing in accordance with various embodiments.
Figure 5C:
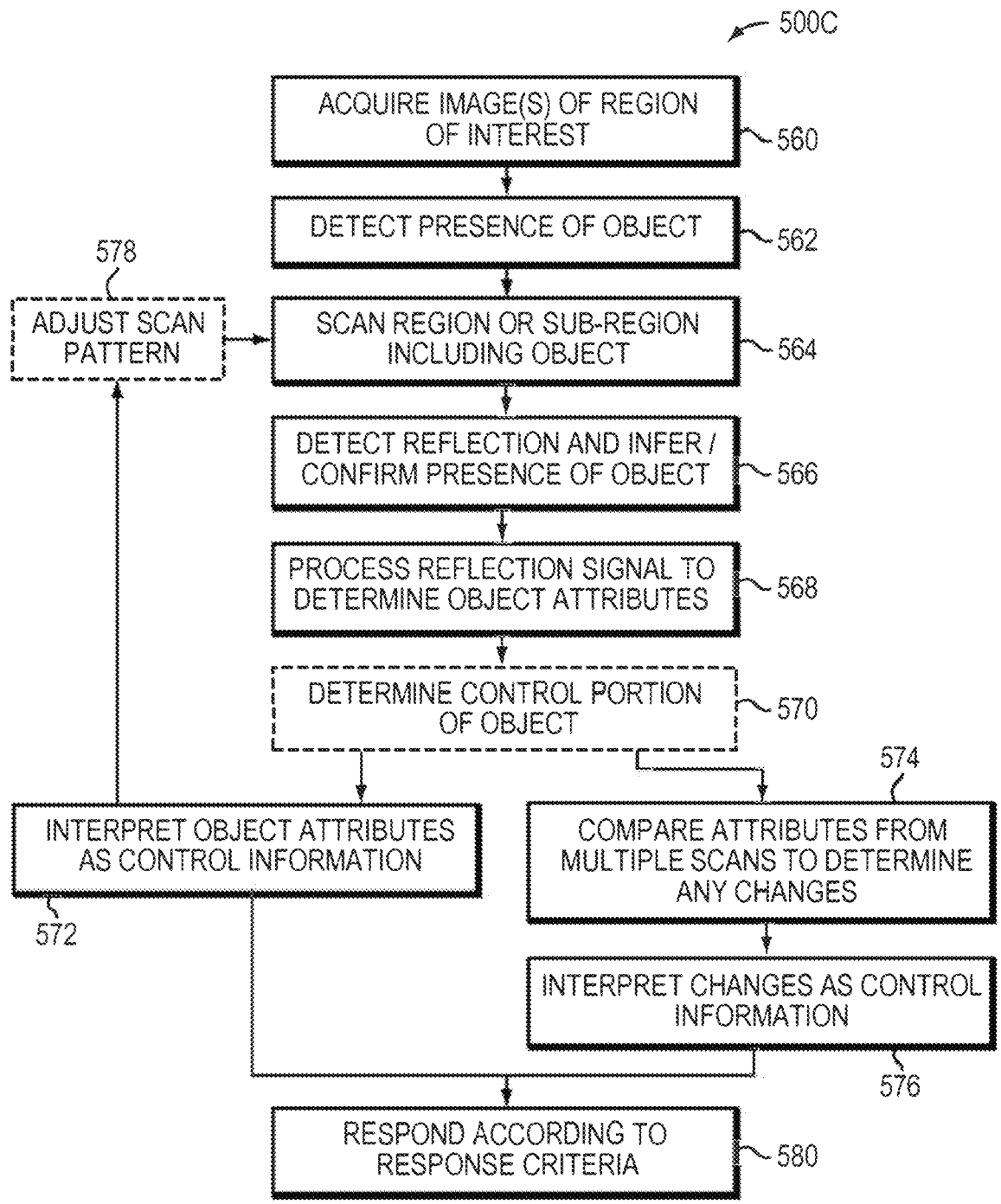

Referring now to FIGS. 5A-5C, various methods for detecting control objects and attributes and state changes thereof using systems as described above are illustrated. In one embodiment, shown by flowchart 500A in FIG. 5A, a region of interested is repeatedly scanned by spatiotemporally variable emissions, and detected reflectance signals are analyzed to identify the object and monitor its movements and other attributes. Initially, one or more pre-scans may be performed (502) to monitor the region for the presence of any objects therein. If desirable to improve the signal-to-noise ratio, signals from two or more scans may be averaged. The pre-scan(s) may be conducted at a low or moderate spatial resolution (compared with subsequent scans) in accordance with a first scan pattern. For example, a wide-angle emission may be directed successively into the four quadrants of a room. The system may be configured such that, in the absence of any object within the region, any reflection by physical boundaries of or beyond the region (e.g., walls) is low in intensity (in some embodiments below the noise threshold), whereas the presence of an object generally results in detectable reflectance signal. A full emission cycle (corresponding, e.g., to the sequential activation of all individual emitters) preferably illuminates the entire region of interest such that an object of any size anywhere within the region causes a detectable reflectance. Alternatively, if objects of interest are known a priori to have a certain minimum size, illumination of only a fraction of the region in accordance with a pattern that provides sufficiently dense coverage to resolve objects of the size of the objects of interest may be used. For instance, if the region is scanned for a person, narrow-angle emissions that scan the region at a resolution of about 10 cm (i.e., such that the emissions intercept any plane in the region of interest about every 10 cm) may suffice.

Once a reflectance has been detected (504) in a pre-scan, upon which a presence of an object can be inferred, the region may be scanned (506) in accordance with a second, higher-resolution scan pattern. This higher-resolution scan may take longer than the pre-scan, i.e., the cycle time may be increased. Alternatively, with the requisite signal-processing power available, the emission system may be operated faster, e.g., by sampling the reflection signal at a higher rate to accommodate the higher resolution without decreasing the repetition rate (i.e., increasing the cycle time) for the scan. Again, multiple of the higher-resolution scans may be averaged to improve the signal-to-noise ratio. The reflection signal of the refined scan may be used to confirm (508) the presence of an object of interest as well as determine (510) object attributes such as location, shape, configuration, surface detail, etc. In some embodiments, the object attributes may be used to identify (512) a portion of the object as the control portion. For instance, in an application context where machine control is performed by hand gestures, the system may, upon detection of a person in the region of interest, determine and analyze the person's contours to identify the person's hand or even individual fingers. Following such identification of control portions, subsequent scans may be limited to a region containing the control portion to save unnecessary computational expense.

An individual fine scan of the control object (or object portion) may by itself provide attributes sufficient to be interpreted (514) as control information to a machine or application under control. For instance, if a scan captures sufficient surface detail about a human operator's face, such information may be used to identify the operator and authorize the operator's access to the system. In many instances, however, control information is based on a plurality of scans and comparisons (516) therebetween. For example, scans (or sequences of scans that are averaged for noise-reduction purposes) may be repeated to determine object attribute sets at different points in time and facilitate comparisons (518) between these object attributes sets to detect any state changes (i.e., movements, deformations, changes in shape or configuration, etc.) of the control object. In some embodiments, the pre-scan(s) provide estimates of object attributes that allow comparisons with object attributes determined from a subsequent more refined scan, and in some embodiments, state changes are determined based on comparisons of two or more of the refined scans performed according to the second scan pattern. In yet further embodiments, the scan pattern may be varied (resulting in third, fourth, fifth patterns, etc.), e.g., to make adjustments for state changes of the control object. For example, as the control object moves, the scanned region may be moved along with it so as to track the object. As another example, if detected object attributes indicate a type of control input that requires more or less detail, finer or coarser scans may subsequently be performed by adjusting (520) the scan pattern and performing additional scan(s). Thus, control input discerned from the object attributes may be provided as feedback to the scan itself.

Additionally, the object attribute sets may be further processed and/or interpreted (522) as control information. In some embodiments, the control information includes the position or orientation of the control object relative to a programmatically defined "virtual" object, such as an engagement plane or other engagement target; see FIGS. 8A and 8B below. The control information, in turn, may be used as input to a device or application under control to elicit a response. The response is typically determined based on response criteria, which may be stored in memory accessible by the device or application under control. Response criteria allow control information to be filtered and a particular type of control information to cause different responses, depending on contextual information. Response criteria may include, e.g., the type of device or application that is being controlled; the status, mode, or settings of the device or application; the currently active user; the time of day; environmental parameters (e.g., lighting conditions, temperature, etc.); combinations thereof; and others. Possible responses include actions taken by the device or application under control (such as movement of a cursor or selection of an on-screen virtual object in response to a movement of the control object; granting of access to a secure system in response to the detection of an authorized user based on, e.g., biometric information; a physical action by a machine under control (e.g., movement of a robot part, dispensing of a fluid, printing of a document, etc.)), but also the absence of any action if the system discerns, for instance, that the detected control information was noise, an error, or can be ignored for other reasons.

FIG. 5B illustrates an embodiment in which scanning and image-based sensing functionalities are used in conjunction. Flowchart 500B of FIG. 5B shows a region of interest may initially be scanned (or pre-scanned) (530) to detect any objects of interest therein. A reflectance signal observed (532) can indicate a presence of an object in the region. Images of the region may be acquired (534). The images may be processed to locate (536) the object therein and determine (538) object attributes. For example, two or more cameras viewing the region from different vantage points may be used to image the region simultaneously to reconstruct the three-dimensional position, shape, configuration, and orientation of the object as described above with respect to FIGS. 4B-1 through 4B-3. In some embodiments, a control portion of the object is identified (540), and attributes specific to that control portion are determined. An individual set of attributes from the control object (or object portion) may by itself be sufficient to be interpreted (542) as control information to a machine or application under control. For example, if the control portion is a finger, the finger orientation or fingertip position may be computed. As another example, if the control portion is a person's face, key points and features of the face (e.g., the position of the nose tip, the distance between the eyes, the orientation of eyebrows, the curvature of the lips, etc.) can be extracted for purposes of identification of the person, characterization of a facial expression, or others. A temporal sequence of images (or pairs or multiplets of images taken with two or more cameras) may be acquired and compared (544) to track changes in the attributes of the control object or object portion. The attributes and changes thereof may be interpreted (546) as control information and used to cause a suitable response (550) by the machine or application under control, again, in general, in accordance with response criteria. The control information may also include control feedback to the imaging hardware itself. For instance, imaging parameters such as the frame rate, spatial resolution (which may be varied, e.g., by reading out only a subset of pixels or interlacing rows), noise threshold, etc. may be adjusted (548) based on the speed with which the control object moves, its size, the image contrast, and/or other object attributes.

Imaging of the region may continue until a termination criterion is satisfied, such as, e.g., when the control object has left the region, has ceased to move, or has provided control information (e.g., a characteristic gesture) indicative of deliberate termination, as determined, e.g., from the images themselves. Upon termination, the scanner hardware, which may have been idle during the imaging, may resume scanning the region. Alternatively, the scanner may continue scanning the region during the imaging, and the imaging may be controlled based thereon. For example, the scans may be used to track the location of a control object within a larger region and continuously adjust the field of view of the imaging camera(s) to center them at the object location, to detect a second control object entering the region, or to discern satisfaction of a termination criterion.

In yet another embodiment, shown by flowchart 500C in FIG. 5C, initial imaging of the region is combined with subsequent repeated scanning thereof to obtain more detailed information. For example, a wide-angle camera with a large, static field of view may acquire (560) images to "monitor" a region for any motions, foreground objects, or recognizable control objects (e.g., as stored in a library of template images) to identify possible control objects within the region. Upon detection (562) of the presence of a control object, one or more fine scans of the region, or a subregion around the object, may be conducted (564). Reflection can be detected to confirm (566) the presence of the object. Processing the reflection can determine (568) object attributes. A control portion of the object can be determined (570) from the reflection information, and attributes associated with the control portion can be interpreted (572) as control information. Alternatively, or additionally, attributes from multiple scans can be compared (574) to track changes of such object attributes. Changes in attributes can be interpreted (576) as control information and used to cause a suitable response (580) by the machine or application under control, again, in general, in accordance with response criteria. The scan parameters, such as the size and location of the subregion to be scanned or the particular scan pattern used, may depend at least in part on information from the initial imaging, and may be further adjusted (578) based on control information derived from the scans.

Imaging and scanning of a region may also be combined on equal footing, i.e., information obtained through both sensing modalities may be used in conjunction to monitor control object attributes and derive control information therefrom. The two modalities may provide redundant information, useful, e.g., for detecting error conditions in either modality, or complementary information that can increase the accuracy and/or completeness of the control information. For example, scanning may provide a means for accurately tracking the location of a fast-moving control object, while imaging the object (possibly at a much lower rate than the scan rate) with two cameras with overlapping fields of view may facilitate obtaining detailed information about the object's shape and surface features.

Figure 6A:
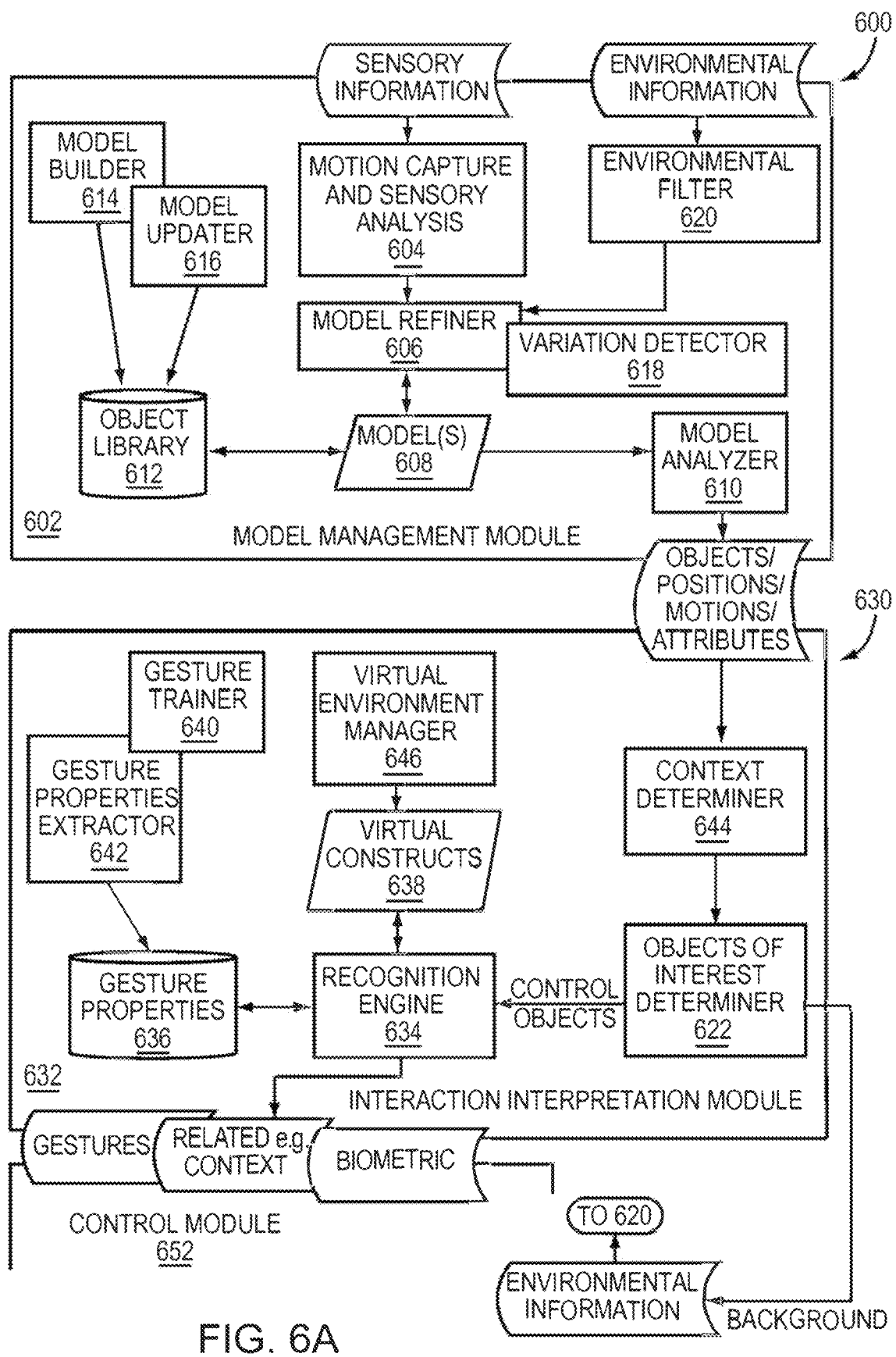
FIGS. 6A and 6B illustrate a variation determination system in accordance with various embodiments.
Figure 6B:
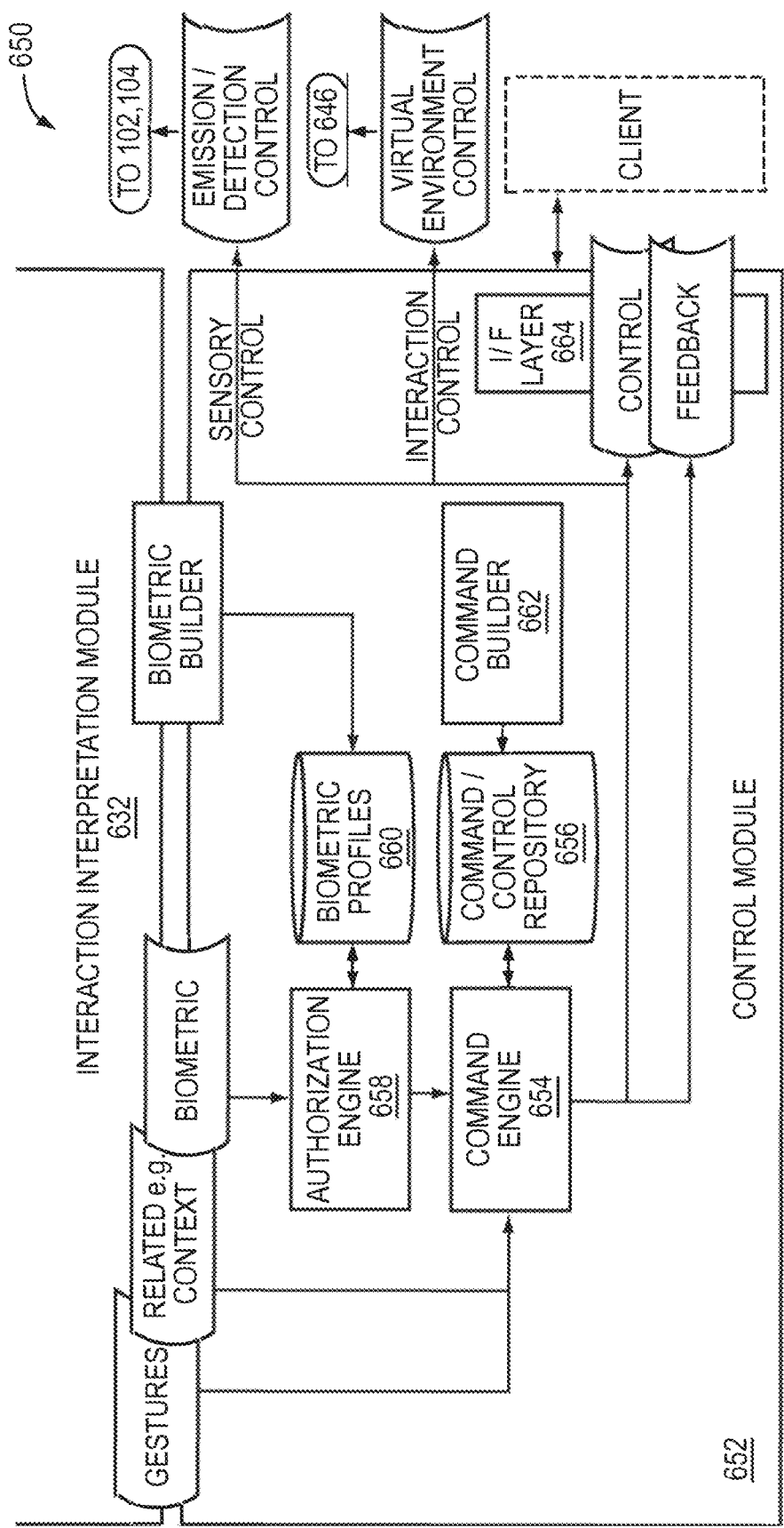

With reference to FIGS. 6A and 6B, a system for processing the reflectance signals and/or images acquired by the detection system to determine control information therefrom will now be described in detail. As shown, a variation-determination system 600 may comprise a model-management module 602 that provides functionality to build, modify, customize, and update one or more models to recognize variations in objects, positions, motions and attribute state and/or change in attribute state (of one or more attributes) from sensory information obtained from detection system 100. The model-management module 602 may model the variations in real-time as sensory information is received, or even predict variations based on a predictive model that can be updated and refined using the sensory information. A motion capture and sensory analyzer 604 finds motions (i.e., translational, rotational), conformations, and presence of objects within sensory information provided by detection system 100. The findings of motion capture and sensory analyzer 604 serve as input of sensed (e.g., observed) information from the environment with which model refiner 606 can update predictive information (e.g., models, model portions, model attributes, etc.).

The model refiner 606 may update one or more models 608 (or portions thereof) from sensory information (e.g., images, scans, other sensory-perceptible phenomena) and environmental information (i.e., context, noise, and so forth); enabling a model analyzer 610 to recognize object, position, motion, and/or attribute information that might be useful in controlling a machine. Model refiner 606 employs an object library 612 to manage objects including one or more models 608 (e.g., of user portions (e.g., hand, face), other control objects (e.g., styli, tools) or the like) (see, e.g., the models depicted in FIGS. 7A and 7B), and/or model components (e.g., shapes, 2D model portions that sum to 3D, outlines and/or outline portions (e.g., closed curves), attributes (e.g., attach points, neighbors, sizes (e.g., length, width, depth), rigidity/flexibility, torsional rotation, degrees of freedom of motion, and others), and so forth) useful to define and update models 608 and model attributes. While illustrated with reference to a particular embodiment in which models, model components, and attributes are co-located within a common object library 612, it should be understood that these objects will be maintained separately in some embodiments.

With the model-management module 602, one or more object attributes may be determined based on the detected light. Object attributes may include (but are not limited to) the presence or absence of the object; positional attributes such as the (e.g., one-, two-, or three-dimensional) location and/or orientation of the object (or locations and/or orientations of various parts thereof); dynamic attributes characterizing translational, rotational, or other forms of motion of the object (e.g., one-, two-, or three-dimensional momentum or angular momentum); physical attributes (e.g., structural or mechanical attributes such as appearance, shape, structure, conformation, articulation, deformation, flow/dispersion (for liquids), elasticity); optical properties or, more generally, properties affecting or indicative of interaction with electromagnetic radiation of any wavelength (e.g., with color, translucence, opaqueness, reflectivity, absorptivity); and/or even chemical properties (as inferred, e.g., from optical properties) (such as material properties and composition).

In some embodiments, scanning the region involves multiple emission cycles. During different emission cycles, the region may (but need not) be scanned in accordance with different scan patterns. For example, an initial emission cycle may serve to detect an object, and during a subsequent cycle, a more refined scan pattern may serve to capture surface detail about the object, determining positional information for at least a portion of the object, or determining other kinds of object attributes. Multiple sequential emission cycles may also serve to detect changes in any of the object attributes, e.g., due to motion or deformation; for such differential object-attribute determinations, the same or similar scan patterns are typically used throughout the cycles. The object attributes may be analyzed to identify a potential control surface of the object.

Figure 7A:
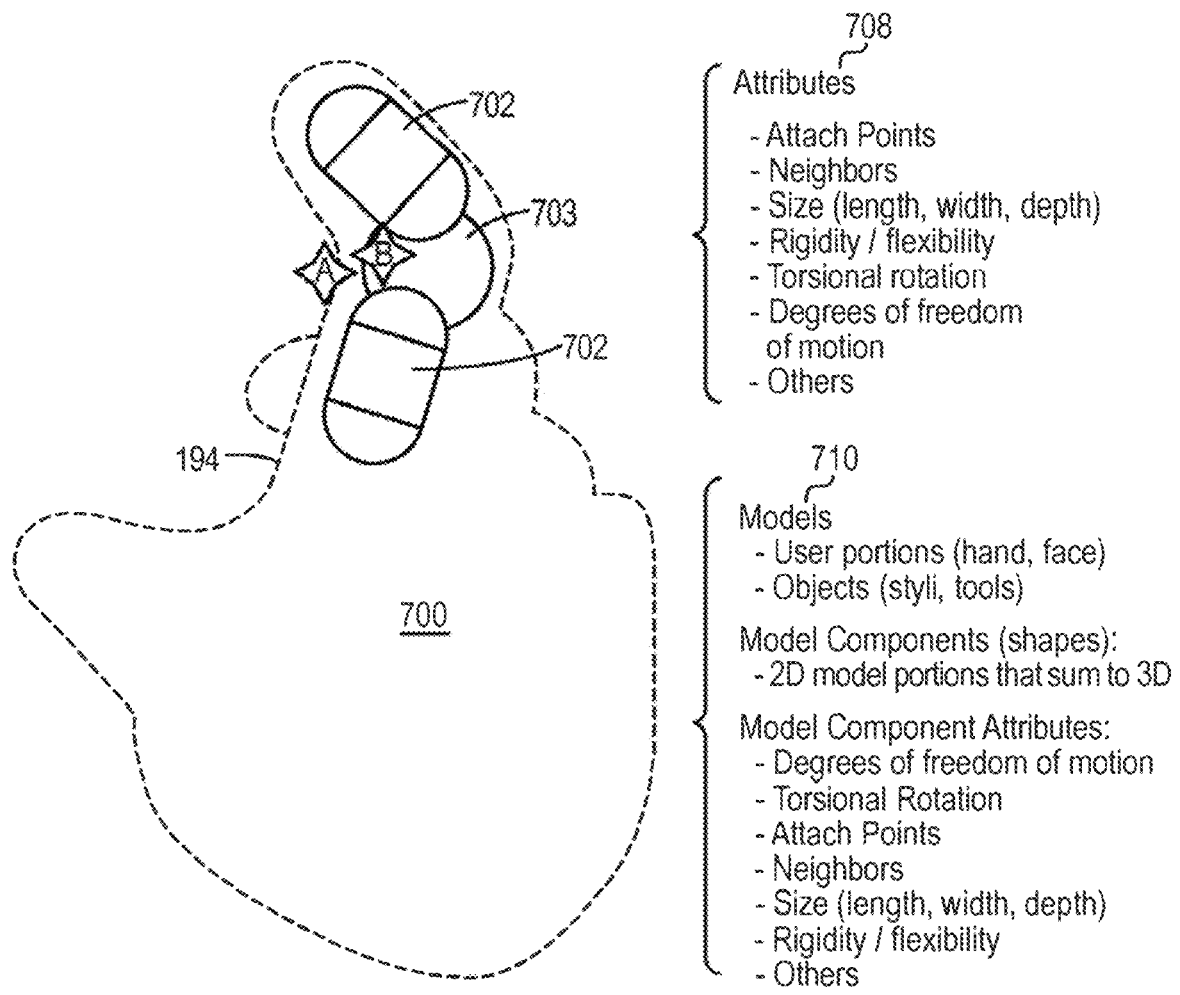
FIGS. 7A and 7B illustrate predictive information including a model in accordance with various embodiments.

FIG. 7A illustrates predictive information including a model 700 of a control object constructed from one or more model subcomponents 702, 703 selected and/or configured to represent at least a portion of a surface of control object 112, a virtual surface portion 706 and one or more attributes 708. Other components can be included in predictive information 710 not shown in FIG. 7A for clarity sake; such as models (user portions (hand, face), objects (styli, tools), model components (shapes, e.g., 2D model portions that sum to 3D), and model-component attributes (e.g., degrees of freedom of motion, torsional rotation, attach points, neighbors, size (length, width, depth), rigidity/flexibility), and others). In an embodiment, the model subcomponents 702, 703 can be selected from a set of radial solids, which can reflect at least a portion of a control object 112 in terms of one or more of structure, motion characteristics, conformational characteristics, other types of characteristics, and/or combinations thereof. In one embodiment, radial solids include a contour and a surface defined by a set of points having a fixed distance from the closest corresponding point on the contour. Another radial solid embodiment includes a set of points a fixed distance from corresponding points on a contour along a line normal thereto. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 702) includes a "capsuloid", i.e., a capsule-shaped solid including a cylindrical body and semi-spherical ends. Another type of radial solid (e.g., 703) includes a sphere. Other types of radial solids can be identified based on the foregoing teachings.

Figure 7B:
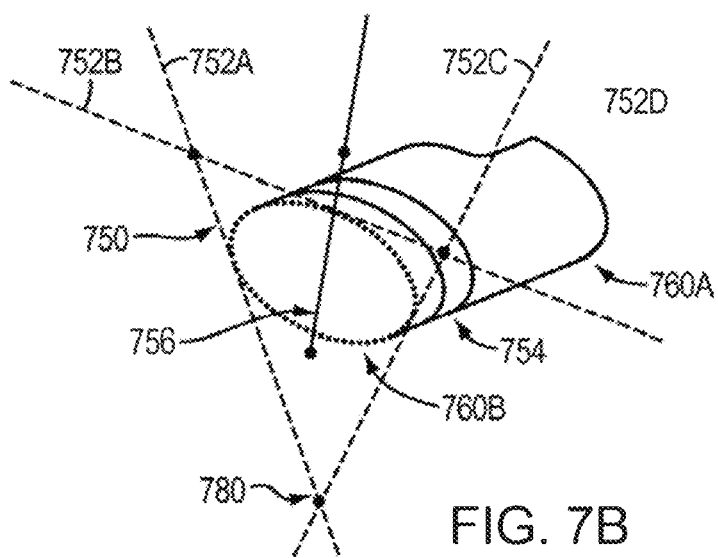

In an embodiment and with reference to FIG. 7B, updating predictive information to observed information comprises selecting one or more sets of points 750 in space surrounding or bounding the control object within a field of view of one or more image-capture device(s). As shown, points 750 can be determined using one or more sets of lines 752A, 752B, 752C, and 752D originating at vantage point(s) associated with the image-capture device(s) (e.g., FIG. 1: 130A, 130B) and determining therefrom one or more intersection point(s) defining a bounding region (i.e., region formed by lines 752A, 752B, 752C, and 752D) surrounding a cross-section of the control object. The bounding region can be used to define a virtual surface (FIG. 7A: 706) to which model subcomponents 702, 703, and 754 can be compared. The virtual surface 706 can include a visible portion 760A and a non-visible "inferred" portion 760B. Virtual surfaces 706 can include straight portions and/or curved surface portions of one or more virtual solids (i.e., model portions) determined by model refiner 606.

For example and according to one embodiment illustrated by FIG. 7B, model refiner 606 determines to model subcomponent 754 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_c, y_c)$ the center, a and b the axes, and $\theta$ the rotation angle, the coefficients $C_1$, $C_2$ and $C_3$ are defined in terms of these parameters, as shown:

$$C_1 x^2 + C_2 xy + C_3 y^2 - (2C_1 x_c + C_2 y_c)x - \qquad (1)$$
$$(2C_3 y_c + C_2 x_c)y + (C_1 x_c^2 + C_2 x_c y_c + C_3 y_{c52}^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for $\theta$, subject to the constraints that: (1) $(x_c c, y_c)$ must lie on the centerline determined from the four tangents 752A, 752B, 752C, and 752D (i.e., centerline 756 of FIG. 7B); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_c$ position, then solving for the value of $y_c$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 752A, 752B, 752C, and 752D identified in an image slice as described above.

$$A_1 x + B_1 y + D_1 = 0$$
$$A_2 x + B_2 y + D_2 = 0$$
$$A_3 x + B_3 y + D_3 = 0$$
$$A_4 x + B_4 y + D_4 = 0 \qquad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \setminus \begin{bmatrix} -D_1 \\ -D_3 \end{bmatrix} \qquad (3)$$

-continued
$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1/\delta 2$$

$$q = c1_1 - c1_2 * p$$

$$G = Ap + B$$

$$H = Aq + D \qquad (4)$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix} \qquad (5)$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for θ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \qquad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of θ are defined as θ=a tan(t).

$$Q_8 = 4A_1^2 n^2 v_{B2}^2 + 4 v_{B2} B_1^2 (1 - n^2 v_{A2}) - (G_1 (1 - n^2 v_{A2}) w_{B2} + n^2 v_{B2} w_{A2} + 2H_1 v_{B2})^2 \qquad (7)$$

$$Q_7 = -(2(2n^2 v_{AB} w_{A2} + 4H_1 v_{AB} + 2G_1 n^2 v_{AB} w_{B2} + 2G_1 (1 - n^2 v_{A2}) w_{AB}))(G_1 (1 - n^2 v_{A2}) w_{B2} + n^2 v_{B2} w_{A2} + 2H_1 v_{B2}) - 8A_1 B_1 n^2 v_{B2} + 16A_1^2 n^2 v_{AB} v_{B2} + (4(2A_1 B_1 (1 - n^2 v_{A2}) + 2B_1^2 n^2 v_{AB})) v_{B2} + 8B_1^2 (1 - n^2 v_{A2}) v_{AB} \qquad (8)$$

$$Q_6 = -(2(2H_1 v_{B2} + 2H_1 v_{A2} + n^2 v_{A2} w_{A2} + n^2 v_{B2} (-2w_{AB} + w_{B2}) + G_1 (n^2 v^{B2} + 1) w_{B2} + 4G_1 n^2 v_{AB} w_{AB} + G_1 (1 - n^2 v_{A2}) v_{A2})) \times (G_1 (1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1 (1 - n^2 v_{A2}) w_{AB})^2 + 4B_1^2 n^2 v_{B2}^2 - 32A_1 B_1 n^2 v_{AB} v_{B2} + 4A_1^2 n^2 (2 v_{A2} v_{B2} + 4 v^2{}_{AB}) + 4A_1^2 n^2 v_{B2}^2 + (4(A_1^2 (1 - n^2 v_{A2}) + 4A_1 B_1 n^2 v_{AB} + B_1^2 (-n^2 v_{B2} + 1) + B_1^2 (1 - n^2 v_{A2})) v_{B2} + (8(2A_1 B_1 (1 - n^2 v_{A2}) + 2B_1^2 n^2 v_{AB})) v_{AB} + 4B_1^2 (1 - n^2 v_{A2}) v_{A2} \qquad (9)$$

$$Q_5 = -(2(4H_1 v_{AB} + 2G_1 (-n^2 v_{B2} + 1) w_{AB} + 2G_1 n^2 v_{AB} v_{A2} + 2n^2 v_A (-2w_{AB} + w_{B2})))(G_1 (1 - n^2 v_{A2}) w_{B2} + n^2 v_{B2} w_{A2} + 2H_1 v_{B2}) - (2(2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2})) \times (2n^2 v_{AB} w_{A2} + 4H_1 v_{AB} + 2G_1 n^2 v_{AB} w_{B2} + 2G_1 (1 - n^2 v_{A2}) w_{AB}) + 16B_1^2 n^2 v_{AB} v_{B2} - 8A_1 B_1 n^2 (2 v_{A2} v_{B2} + 4 v_{AB}^2) + 16A_1^2 n^2 v_{A2} v_{AB} - 8A_1 B_1 n^2 v_{B2}^2 + 16A_1^2 n^2 v_{AB} v_{B2} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{B2} + (8(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{AB} + (4(2A_1 B_1 (1 - n^2 v_{A2}) + 2B_1^2 n^2 v_{AB})) v_{A2} \qquad (10)$$

$$Q_4 = (4(A_1^2 (-n^2 v_{B2}) + A_1^2 (1 - n^2 v_{A2}) + 4A_1 B_1 n^2 v_{AB} + B_1^2 (-n^2 v_{B2} + 1))) v_{B2} + (8(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{AB} + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{A2} + 4B_1^2 n^2 (2 v_{A2} v_{B2} + 4 v_{AB}^2) - 32A_1 B_1 n^2 v_{A2} v_{AB} + 4A_1^2 n^2 v_{A2}^2 + 4B_1^2 n^2 v_{B2}^2 - 32A_1 B_1 n^2 v_{AB} v_{B2} + 4A_1^2 n^2 (2 v_{A2} v_{B2} + 4 v_{AB}^2) - (2(G_1 (-n^2 v_{B2} + 1) v_{A2} + n^2 v_{A2} (-2w_{AB} + w_{B2}) + 2H_1 v_{A2}))(G_1 (1 - n^2 v_{A2}) w_{B2} + n^2 v_{B2} w_{A2} + 2H_1 v_{B2}) - (2(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))) \times (2n^2 v_{AB} w_{A2} + 4H_1 v_{AB} + 2G_1 n^2 v_{AB} w_{B2} + 2G_1 (1 - n^2 v_{A2}) w_{AB}) - (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2})^2 \qquad (11)$$

$$Q_3 = -(2(G_1 (-n^2 v_{B2} + 1) v_{A2} + n^2 v_{A2} (-2w_{AB} + w_{B2}) + 2H_1 v_{A2}))(2n^2 v_{AB} w_{A2} + 4H_1 v_{AB} + 2G_1 n^2 v_{AB} w_{B2} + 2G_1 (1 - n^2 v_{A2}) w_{AB}) - (2(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))) \times (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) + 16B_1^2 n^2 v_{A2} v_{AB} - 8A_1 B_1 n^2 v_{A2}^2 + 16B_1^2 n^2 v_{AB} v_{B2} - 8A_1 B_1 n^2 (2 v_{A2} v_{B2} + 4 v_{AB}^2) + 16A_1^2 n^2 v_{A2} v_{AB} + (4(2A_1^2 n^2 v_{AB} + 2A_1 B_1 (-n^2 v_{B2} + 1)))) v_{B2} + (8(A_1^2 (-n^2 v_{B2} + 1) + A_1^2 (-n^2 v_{A2}) + 4A_1 B_1 n^2 v_{AB} + B_1^2 (-n^2 v_{B2} + 1))) v_{AB} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{A2} \qquad (12)$$

$$Q_2 = 4A_1^2 (-n^2 v_{B2} + 1) v_{B2} + (8(2A_1^2 n^2 v_{AB} + 2A_1 B_1 (-n^2 v^{B2} + 1))) v_{AB} + (4(A_1^2 (-n^2 v_{B2} + 1) + A_2^2 (1 - n^2 v_{A2}) + 4A_1 B_1 n^2 v_{AB} + B_1^2 (-n^2 v_{B2} + 1))) v_{A2} + 4B_1^2 n^2 v_{A2}^2 + 4B_1^2 n^2 (2 v_{A2} v_{B2} + 4 v_{AB}^2) - 32A_1 B_1 n^2 v_{A2} v_{AB} + 4A_1^2 n^2 v_{A2}^2 - (2(G_1 (-n^2 v_{B2} + 1) v_{A2} + n^2 v_{A2} (-2w_{AB} + w_{B2}) + 2H_1 v_{A2})) \times (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) - (4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))^2 \qquad (13)$$

$$Q_1 = 8A_1^2 (-n^2 v_{B2} + 1) v_{AB} + (4(2A_1^2 n^2 v_{AB} + 2A_1 B_1 (-n^2 v_{BR} + 1)))) v_{A2} + 16B_1^2 n^2 v_{A2} v_{AB} - 8A_1 B_1 n^2 v^2{}_{A2} - (2(G_1 (-n^2 v_{B2} + 1) v_{A2} + n^2 v_{A2} (-2w_{AB} + w_{B2}) + 2H_1 v_{A2})) (4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2})) \qquad (14)$$

$$Q_0 = 4A_1^2 (-n^2 v_{B2} + 1) v_{A2} - (G_1 (-n^2 v_{B2} + 1) v_{A2} + n^2 v_{A2} (-2w_{AB} + w_{B2}) + 2H_1 v_{A2})^2 + 4B_1^2 v^2{}_{A2} \qquad (15)$$

In this exemplary embodiment, equations (6)-(15) have at most three real roots; thus, for any four tangent lines, there are at most three possible ellipses that are tangent to all four lines and that satisfy the $a = a_0$ constraint. (In some instances, there may be fewer than three real roots.) For each real root θ, the corresponding values of $(x_c, y_c)$ and b can be readily determined. Depending on the particular inputs, zero or more solutions will be obtained; for example, in some instances, three solutions can be obtained for a typical configuration of tangents. Each solution is completely characterized by the parameters $\{\theta, a=a_0, b, (x_c, y_c)\}$. Alternatively, or additionally, referring to FIGS. 6A and 6B, a model builder 614 and model updater 616 provide functionality to define, build, and/or customize model(s) 608 using one or more components in object library 612. Once built, model refiner 606 updates and refines the model, bringing the predictive information of the model in line with observed information from the detection system 102.

The model subcomponents 702, 703, 754 can be scaled, sized, selected, rotated, translated, moved, or otherwise re-ordered to enable portions of the model corresponding to the virtual surface(s) to conform within the points 750 in space. Model refiner 606 employs a variation detector 618 to substantially continuously determine differences between sensed information and predictive information and provide to model refiner 606 a variance useful to adjust the model 608 accordingly. Variation detector 618 and model refiner 606 are further enabled to correlate among model portions to preserve continuity with characteristic information of a corresponding object being modeled, continuity in motion, and/or continuity in deformation, conformation and/or torsional rotations.

In an embodiment, when the control object morphs, conforms, and/or translates, motion information reflecting such motion(s) is included in the observed information. Points in space can be recomputed based on the new observation information. The model subcomponents can be scaled, sized, selected, rotated, translated, moved, or otherwise re-ordered to enable portions of the model corresponding to the virtual surface(s) to conform to the set of points in space.

In an embodiment, motion(s) of the control object can be rigid transformations, in which case points on the virtual surface(s) remain at the same distance(s) from one another through the motion. Motion(s) can be non-rigid transformations, in which points on the virtual surface(s) can vary in distance(s) from one another during the motion. In an embodiment, observation information can be used to adjust (and/or re-compute) predictive information, thereby enabling "tracking" the control object. In embodiments, the control object can be tracked by determining whether a rigid transformation or a non-rigid transformation occurs. In an embodiment, when a rigid transformation occurs, a transformation matrix is applied to each point of the model uniformly. Otherwise, when a non-rigid transformation occurs, an error indication can be determined, and an error-minimization technique such as described herein above can be applied. In an embodiment, rigid transformations and/or non-rigid transformations can be composed. One example composition embodiment includes applying a rigid transformation to predictive information. Then an error indication can be determined, and an error minimization technique such as described herein above can be applied. In an embodiment, determining a transformation can include calculating a rotation matrix that provides a reduced RMSD (root mean squared deviation) between two paired sets of points. One embodiment can include using Kabsch Algorithm to produce a rotation matrix. In an embodiment and by way of example, one or more force lines can be determined from one or more portions of a virtual surface.

Collisions: In an embodiment, predictive information can include collision information concerning two or more capsuloids. By means of illustration, several possible fits of predicted information to observed information can be removed from consideration based upon a determination that these potential solutions would result in collisions of capsuloids. In an embodiment, a relationship between neighboring capsuloids, each having one or more attributes (e.g., determined minima and/or maxima of intersection angles between capsuloids) can be determined. In an embodiment, determining a relationship between a first capsuloid having a first set of attributes and a second capsuloid having a second set of attributes includes detecting and resolving conflicts between first attributes and second attributes. For example, a conflict can include a capsuloid having one type of angle value with a neighbor having a second type of angle value incompatible with the first type of angle value. Attempts to attach a capsuloid with a neighboring capsuloid having attributes such that the combination will exceed what is allowed in the observed—or to pair incompatible angles, lengths, shapes, or other such attributes—can be removed from the predicted information without further consideration.

Lean Model: In an embodiment, predictive information can be artificially constrained to capsuloids positioned in a subset of the observed information—thereby enabling creation of a "lean model." For example, as illustrated in FIG. 7A, capsuloid 702 could be used to denote the portion of the observed without addition of capsuloids 703. In a yet further embodiment, connections can be made using artificial constructs to link together capsuloids of a lean model. In another embodiment, the predictive information can be constrained to a subset of topological information about the observed information representing the control object to form a lean model. In an embodiment, a lean model can be associated with a full predictive model. The lean model (or topological information, or properties described above) can be extracted from the predictive model to form a constraint. Then, the constraint can be imposed on the predictive information, thereby enabling the predictive information to be constrained in one or more of behavior, shape, total (system) energy, structure, orientation, compression, shear, torsion, other properties, and/or combinations thereof.

Figure 7C:
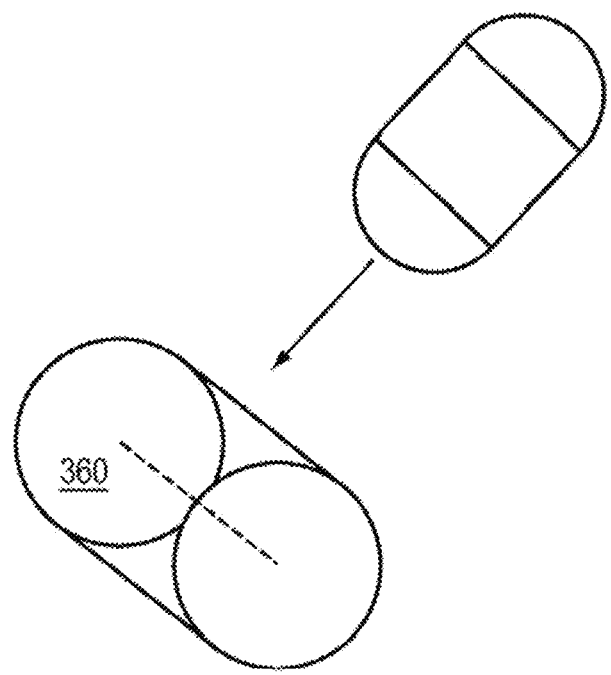
FIGS. 7C and 7D illustrate deformation using the predictive information of FIGS. 7A and 7B.
Figure 7D:
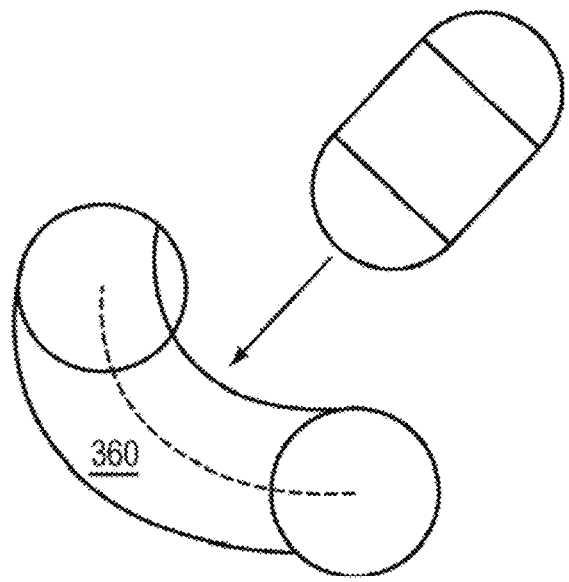

Occlusions: In an embodiment, the observed can include components reflecting portions of the control object which are occluded from view of the device ("occlusions" or "occluded components"). In one embodiment, the predictive information can be "fit" to the observed as described herein above with the additional constraint(s) that some total property of the predictive information (e.g., potential energy) be minimized or maximized (or driven to lower or higher value(s) through iteration or solution). Properties can be derived from nature, properties of the control object being viewed, others, and/or combinations thereof. In another embodiment, as shown by FIGS. 7C and 7D, a deformation of the predictive information subcomponent 760 can be allowed subject to an overall permitted value of compression, deformation, flexibility, others, and/or combinations thereof.

Friction: In an embodiment, a "friction constraint" is applied on the model 700. For example, if fingers of a hand being modeled are close together (in position or orientation), corresponding portions of the model will have more "friction". The more friction a model subcomponent has in the model, the less the subcomponent moves in response to new observed information. Accordingly, the model is enabled to mimic the way portions of the hand that are physically close together move together, and move less overall. Further detail about capsuloids, occlusion, collisions and lean models, friction and robustness can be found in U.S. Provisional Patent Application Nos. 61/871,790, filed Aug. 29, 2013, 61/873,758, filed Sep. 4, 2013, and 61/898,462, filed Oct. 31, 2013, which are hereby incorporated herein by reference in their entirety.

With renewed reference to FIGS. 6A and 6B, an environmental filter 620 reduces extraneous noise in sensed information received from the detection system 100 using environmental information to eliminate extraneous elements from the sensory information. Environmental filter 620 employs contrast enhancement, subtraction of a difference image from an image, software filtering, and background subtraction (using background information provided by objects-of-interest determiner 622 (see below) to enable model refiner 606 to build, refine, manage, and maintain model(s) 608 of objects of interest from which control inputs can be determined.

A model analyzer 610 determines that a reconstructed shape of a sensed object portion matches an object model in an object library, and interprets the reconstructed shape (and/or variations thereon) as user input. Model analyzer 610 provides output in the form of object, position, motion, and attribute information to an interaction system 630.

Figure 8A:
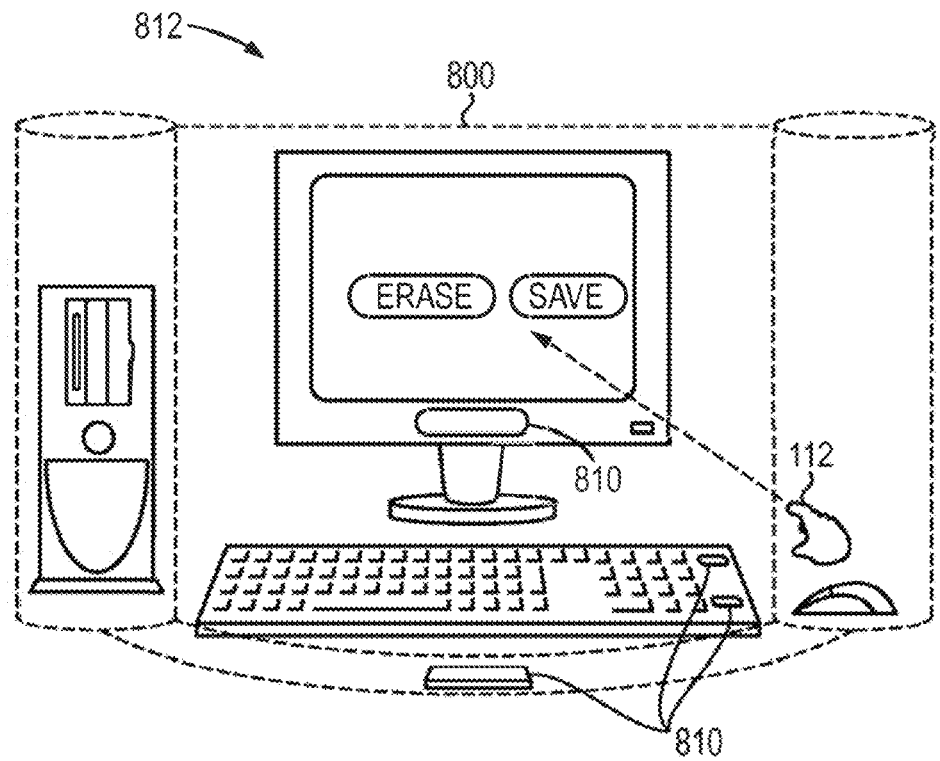
FIGS. 8A and 8B illustrate virtual constructs implementing an engagement target with which a control object interacts in accordance with various embodiments.
Figure 8B:
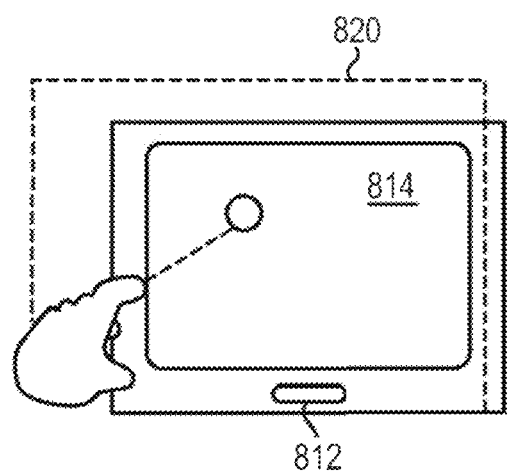

The interaction system 630 includes an interaction-interpretation module 632 that provides functionality to recognize command and other information from object, position, motion and attribute information obtained from variation system 600. An interaction-interpretation module 632 embodiment comprises a recognition engine 634 to recognize command information such as command inputs (i.e., gestures and/or other command inputs (e.g., speech, and so forth)), related information (i.e., biometrics), environmental information (i.e., context, noise, and so forth) and other information discernable from the object, position, motion, and attribute information that might be useful in controlling a machine. Recognition engine 634 employs gesture properties 636 (e.g., path, velocity, acceleration, and so forth), control objects determined from the object, position, motion, and attribute information by an objects-of-interest determiner 622 and optionally one or more virtual constructs 638 (see e.g., FIGS. 8A and 8B: 800 and 820) to recognize variations in control-object presence or motion indicating command information, related information, environmental information, and other information discernable from the object, position, motion, and attribute information that might be useful in controlling a machine. With reference to FIGS. 8A and 8B, virtual construct 800, 820 implement an engagement target with which a control object 112 interacts—enabling the machine sensory and control system to discern variations in control object (i.e., motions into, out of or relative to virtual construct 800, 820) as indicating control or other useful information. Returning to FIGS. 6A and 6B, a gesture trainer 640 and gesture-properties extractor 642 provide functionality to define, build, and/or customize gesture properties 636.

A context determiner 644 and object-of-interest determiner 622 provide functionality to determine from the object, position, motion, and attribute information objects of interest (e.g., control objects, or other objects to be modeled and analyzed) and/or objects not of interest (e.g., background), based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be control objects whereas the user's face will be determined not to be an object of interest (i.e., background). Further, when the context is determined to be a stylus (or other tool) held in the fingers of the user, the tool tip will be determined to be object of interest and a control object whereas the user's fingertips might be determined not to be objects of interest (i.e., background). Background objects can be included in the environmental information provided to environmental filter 620 of model-management module 602.

A virtual environment manager 646 provides creation, selection, modification, and de-selection of one or more virtual constructs 800, 820 (see FIGS. 8A and 8B). In some embodiments, virtual constructs (e.g., a virtual object defined in space such that variations in real objects relative to the virtual construct, when detected, can be interpreted for control or other purposes) are used to determine variations (i.e., virtual "contact" with the virtual construct, breaking of virtual contact, motion relative to a construct portion, and so forth) to be interpreted as engagements, dis-engagements, motions relative to the construct(s), and so forth, enabling the system to interpret pinches, pokes and grabs, and so forth. Interaction-interpretation module 632 provides as output the command information, related information, and other information discernable from the object, position, motion, and attribute information that might be useful in controlling a machine from recognition engine 634 to an application control system 650.

Further with reference to FIGS. 6A and 6B, an application control system 650 includes a control module 652 that provides functionality to determine and authorize commands based upon the command and other information obtained from interaction system 630.

A control module 652 embodiment comprises a command engine 654 to determine whether to issue command(s) and what command(s) to issue based upon the command information, related information, and other information discernable from the object, position, motion, and attribute information, as received from the interaction-interpretation module 632. Command engine 654 employs command/control repository 656 (e.g., application commands, OS commands, commands to the machine sensory and control system, miscellaneous commands) and related information indicating context received from the interaction-interpretation module 632 to determine one or more commands corresponding to the gestures, context, and so forth indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors, or other mechanisms for creating 3D presentations, or may be audible (e.g., mapped to sounds, or other mechanisms for conveying audible information) and/or touchable via haptic techniques.

Further, an authorization engine 658 employs biometric profiles 660 (e.g., users, identification information, privileges, and so forth) and biometric information received from the interaction-interpretation module 632 to determine whether commands and/or controls determined by the command engine 654 are authorized. A command builder 662 and biometric profile builder 660 provide functionality to define, build, and/or customize command/control repository 652 and biometric profiles 660.

Selected authorized commands are provided to machine(s) under control (i.e., "client") via interface layer 664. Commands/controls to the virtual environment (i.e., interaction control) are provided to virtual environment manager 646. Commands/controls to the emission/detection systems (i.e., sensory control) are provided to emission module 102 and/or detection module 104 as appropriate.

For example, if the control object is a hand, analysis of the hand's shape and configuration (which may be the object attributes of interest) may determine the positions of the finger tips, which may constitute the relevant control surfaces. Furthermore, changes in control attributes of the identified control surface(s), such as positional changes of the fingertips, may be analyzed to determine whether they are indicative of control information. In hand-gesture-based machine control, for instance, this may serve to discriminate between deliberate motions intended to provide control input and hand jitter or other inevitable motions. Such discrimination may be based, e.g., on the scale and speed of motion, similarity of the motions to pre-defined motion patterns stored in a library, and/or consistency with deliberate motions as characterized using machine learning algorithms or other approaches.

Further, in some embodiments, as illustrated with reference to FIGS. 8A and 8B, a hand gesture or other motion is analyzed relative to a programmatically defined engagement target (e.g., a plane, curved surface (whether open or closed), point, line, or volume whose position and location in space is well-defined and which need generally not coincide with a physical surface) to determine whether the change in the control surface is indicative of an engagement gesture. For example, if the fingertip pierces an engagement surface, this may be interpreted as a click event, or if one or more fingertips or the entire hand moves substantially parallel to an engagement surface defined relative to a display screen, this may be interpreted as a scrolling gesture. If a particular detected motion (or, more generally, change in object attributes) corresponds to control information, an appropriate response action is taken, generally in accordance with and/or based on response criteria, such as the context in which the control information was received (e.g., the particular software application active at the time, the user accessing the system, an active security level, etc.). The response may involve issuing a command (e.g., open a new document upon a "click," or shift the displayed content in response to a scrolling motion) to a user interface based on the detected gesture or motion. As illustrated in, FIGS. 8A and 8B, a machine sensory and controller system 810 can be embodied as a standalone unit(s) 810 coupleable via an interface (e.g., wired or wireless), embedded (e.g., within a machine 812, 814 or machinery under control), or combinations thereof. Further information about virtual constructs and engagement can be found in U.S. patent application Ser. No. 14/154,730, filed Jan. 14, 2014), the entire disclosure of which is hereby incorporated by reference.

Figure 9:
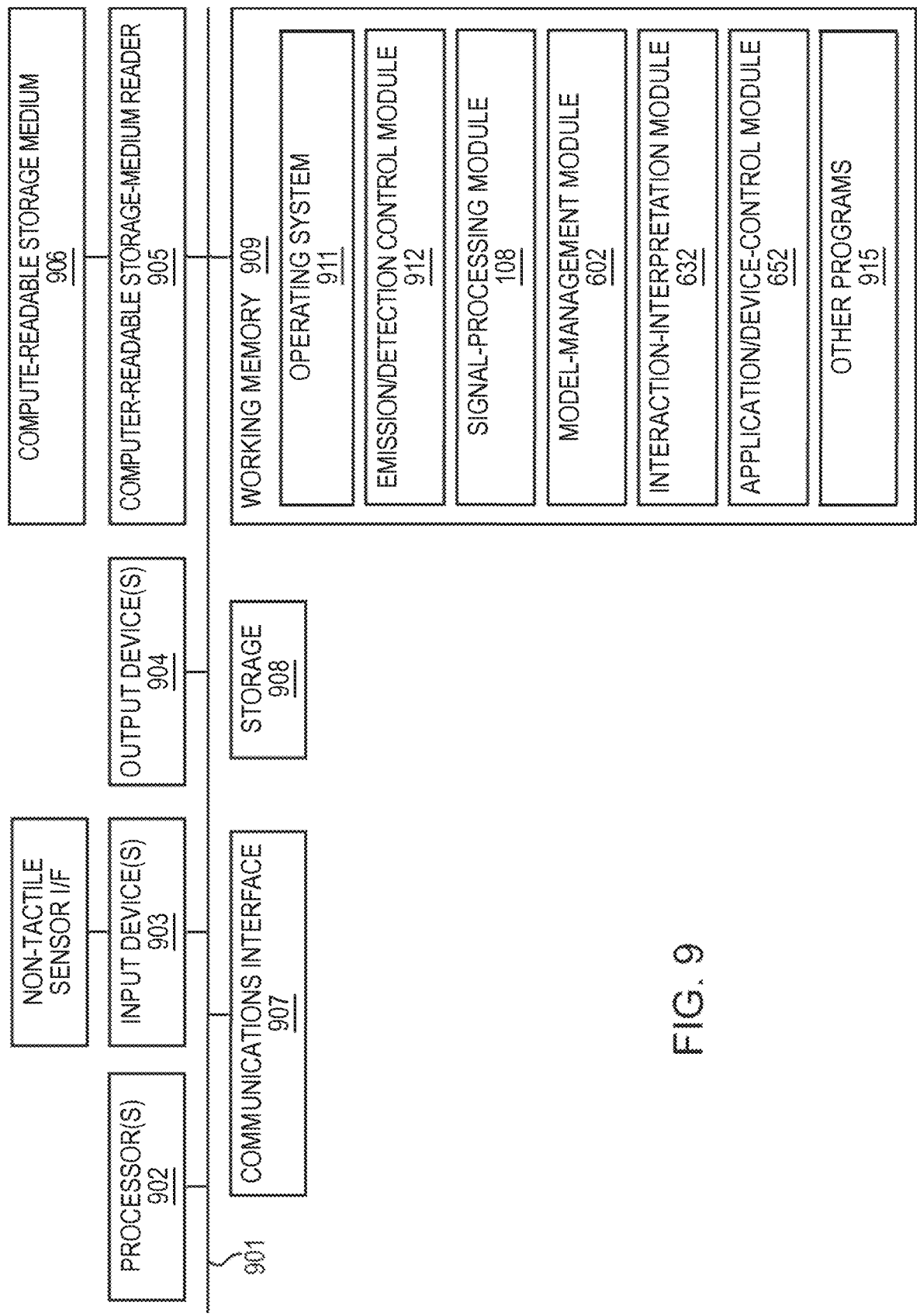
FIG. 9 illustrates a computational facility for sensory-based machine control according to embodiments, components thereof, and interrelations therebetween.

FIG. 9 illustrates an exemplary computing system 900, such as a PC (or other suitable "processing" system), that can comprise one or more of the elements of the machine sensory and control system shown in FIGS. 1 and 4 according to an embodiment. While other application-specific device/process alternatives might be utilized, such as those already noted in discussions of specific embodiments, it will be presumed for clarity sake that various systems 100, 600, 630, 650 are implemented by, or using, one or more processing systems consistent therewith, unless otherwise indicated. As shown, computer system 900 comprises elements coupled via communication channels (e.g., one or more buses 901), including one or more general-purpose or special-purpose processors 902, such as a Pentium® or Power PC®, digital signal processor ("DSP"), or other processing component. System 900 elements also include one or more input devices 903 (such as a mouse, keyboard, joystick, microphone, remote control unit, tactile, biometric or other sensors, and so on), and one or more output devices 904 (such as a suitable display, joystick feedback components, speakers, biometric or other actuators, and so on, in accordance with a particular application).

System 900 elements also include a computer-readable storage-media reader 905 coupled to a computer-readable storage medium 906, such as a storage/memory device or hard or removable storage/memory media; examples are further indicated separately as storage device 908 and non-transitory memory 909, which can include hard disk variants, floppy/compact disk variants, digital versatile disk ("DVD") variants, smart cards, read only memory, random access memory, cache memory or others, in accordance with a particular application (e.g., see data store(s) 612, 636, 656 and 660 of FIGS. 6A and 6B). One or more suitable communication devices 910 can also be included, such as a modem, DSL, infrared, etc. for providing inter-device communication directly or via suitable private or public networks, such as the Internet. Working memory 909 may load therein and/or store processor-executable instructions, programmed in any one or combination of suitable programming languages, such as, e.g., C, C++, Python, Basic, Pascal, Fortran, and/or others. The instructions may be grouped into program modules. For example, as shown, the working memory 909 may store an operating system ("OS") 911 for providing basic system-level functionality (such as file management, memory allocation, and communication with the various input/output and other hardware devices); an emission/detection control module 912 constituting or communicating with the controller 106; a signal-processing module 108; model-management, interaction-interpretation, and application/device-control modules 602, 632, 652; and other programs 915, such as application programs, mobile code, data, or other information for implementing systems 100, 600, 630, 650 elements. However, as will be readily apparent to one of skill in the art, the functionality of systems 100, 600, 630, 650 can also be grouped and organized in many alternative ways.

In general, system 900 element implementations can include hardware, software, firmware, or a suitable combination. When implemented in software (e.g., as an application program, object, downloadable, servlet, and so on, in whole or part), a system 900 element can be communicated transitionally or more persistently from local or remote storage to memory for execution, or another suitable mechanism can be utilized, and elements can be implemented in compiled, simulated, interpretive, or other suitable forms. Input, intermediate or resulting data or functional elements can further reside more transitionally or more persistently in storage media or memory (e.g., storage device 908 or memory 909) in accordance with a particular application.

Certain aspects enabled by input/output processors and other element embodiments disclosed herein (such as the determination of a potential interaction, virtual object selection, or authorization issuance) can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer implemented method for conducting machine control, the method comprising:
   responsive to a detection of a presence of an object in a region of space scanned using a first sensing modality at a first rate of time, performing operations including:
      receiving an imaging of the region of space including the object for at least two cycles using a second sensing modality, the region of space being imaged at a second rate of time, for each cycle, that is longer than the first rate of time, such that each cycle imaged at the second rate of time takes longer than the scanning performed at the first rate of time;
      determining a first set of object attributes of the object for a first imaging cycle of the at least two cycles; and
      determining a second set of object attributes of the object for a second imaging cycle of the at least two cycles;
   determining control information based on the first set of object attributes and the second set of object attributes; and
   responding to the determined control information according to response criteria.

2. The computer implemented method according to claim 1, further comprising scanning the region of space, using the first sensing modality, at the first rate of time, wherein the scanning of the region of space comprises:
   directing at least two emission cycles to form at least two scan patterns from an emission region of the first sensing modality to the region of space, one scan pattern of the at least two scan patterns being different from at least one other scan pattern of the at least two scan patterns;
   detecting a reflectance of the at least two scan patterns; and
   determining that the detected reflectance indicates the presence of the object in the region of space.

3. The computer implemented method according to claim 2, wherein:
   one scan pattern of the at least two scan patterns is configured to provide sequential emissions from emitters of the emission region in a binary manner such that each of the emitters is turned on and off one at a time; and
   at least one other scan pattern of the at least two scan patterns is configured to provide simultaneously overlapping emissions from the emitters.

4. The computer implemented method according to claim 1, wherein the response criteria includes determining whether to respond to the control information.

5. The computer implemented method according to claim 1, wherein the determining of the first set of object attributes and the determining of the second set of object attributes include determining control-portion attributes based at least in part on captured surface detail about the object.

6. The computer implemented method according to claim 1, wherein the determining of the first set of object attributes includes identifying a presence of a hand in the region of space.

7. The computer implemented method according to claim 1, further comprising scanning the region of space, using the first sensing modality, at the first rate of time,
   wherein the scanning of the region of space includes imaging the region of space at the first rate, which provides low resolution imaging of the region of space, and
   wherein the imaging of the region of space includes using the second sensing modality at the second rate to provide high resolution imaging of the region of space.

8. The method of claim 1, wherein the scanning of the region of space pre-scans the region of space to detect the presence of the object before the imaging of the region of space.

9. The computer implemented method according to claim 1, wherein the first sensing modality and the second sensing modality have overlapping fields of view.

10. The computer implemented method according to claim 9, wherein the second sensing modality includes at least two imaging sensors having overlapping fields of view.

11. The computer implemented method according to claim 1, wherein the second sensing modality includes at least two imaging sensors having overlapping fields of view.

12. A non-transitory computer readable storage medium impressed with computer program instructions for conducting machine control, the instructions, when executed on a processor, implement a method comprising:
   responsive to a detection of a presence of an object in a region of space scanned using a first sensing modality at a first rate of time, performing operations including:
      receiving an imaging of the region of space including the object for at least two cycles using a second sensing modality, the region of space being imaged at a second rate of time, for each cycle, that is longer than the first rate of time, such that each cycle imaged at the second rate of time takes longer than the scanning performed at the first rate of time;
      determining a first set of object attributes of the object for a first imaging cycle of the at least two cycles; and
      determining a second set of object attributes of the object for a second imaging cycle of the at least two cycles;
   determining control information based on the first set of object attributes and the second set of object attributes; and
   responding to the determined control information according to response criteria.

13. The non-transitory computer readable storage medium according to claim 12, further comprising scanning the region of space, using the first sensing modality, at the first rate of time, wherein the scanning of the region of space further comprises:

directing at least two emission cycles to form at least two scan patterns from an emission region of the first sensing modality to the region of space, one scan pattern of the at least two scan patterns being different from at least one other scan pattern of the at least two scan patterns;

detecting a reflectance of the at least two scan patterns; and determining that the detected reflectance indicates the presence of the object in the region of space.

14. The non-transitory computer readable storage medium according to claim 13, wherein:

one scan pattern of the at least two scan patterns is configured to provide sequential emissions from emitters of the emission region in a binary manner such that each of the emitters is turned on and off one at a time; and at least one other scan pattern of the at least two scan patterns is configured to provide simultaneously overlapping emissions from the emitters.

15. The non-transitory computer readable storage medium according to claim 12, wherein the response criteria includes determining whether to respond to the control information.

16. The non-transitory computer readable storage medium according to claim 12, wherein the determining of the first set of object attributes and the determining of the second set of object attributes include determining control-portion attributes based at least in part on captured surface detail about the object.

17. A system including one or more processors coupled to memory, the memory loaded with computer instructions for conducting machine control, the instructions, when executed on the processors, implement actions comprising:

responsive to a detection of a presence of an object in a region of space scanned using a first sensing modality at a first rate of time, performing operations including:

receiving an imaging of the region of space including the object for at least two cycles using a second sensing modality, the region of space being imaged at a second rate of time, for each cycle, that is longer than the first rate of time, such that each cycle imaged at the second rate of time takes longer than the scanning performed at the first rate of time;

determining a first set of object attributes of the object for a first imaging cycle of the at least two cycles; and determining a second set of object attributes of the object for a second imaging cycle of the at least two cycles;

determining control information based on the first set of object attributes and the second set of object attributes; and responding to the determined control information according to response criteria.

18. The system according to claim 17, further comprising scanning the region of space, using the first sensing modality, at the first rate of time, wherein the scanning of the region of space comprises:

directing at least two emission cycles to form at least two scan patterns from an emission region of the first sensing modality to the region of space, one scan pattern of the at least two scan patterns being different from at least one other scan pattern of the at least two scan patterns;

detecting a reflectance of the at least two scan patterns; and determining that the detected reflectance indicates the presence of the object in the region of space.

19. The system according to claim 18, wherein:

one scan pattern of the at least two scan patterns is configured to provide sequential emissions from emitters of the emission region in a binary manner such that each of the emitters is turned on and off one at a time; and at least one other scan pattern of the at least two scan patterns is configured to provide simultaneously overlapping emissions from the emitters.

20. The system according to claim 17, wherein the determining of the first set of object attributes and the determining of the second set of object attributes include determining control-portion attributes based at least in part on captured surface detail about the object.

\* \* \* \* \*